United States Patent
Vaneck et al.

(10) Patent No.: US 8,720,822 B2
(45) Date of Patent: May 13, 2014

(54) WING LOAD ALLEVIATION STRUCTURE

(75) Inventors: Thomas Vaneck, Gloucester, MA (US); Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 1446 days.

(21) Appl. No.: 12/139,363

(22) Filed: Jun. 13, 2008

(65) Prior Publication Data

US 2009/0121074 A1 May 14, 2009

Related U.S. Application Data

(60) Provisional application No. 60/943,740, filed on Jun. 13, 2007.

(51) Int. Cl.
*B64C 1/00* (2006.01)
*B64C 3/00* (2006.01)
*B64C 5/00* (2006.01)

(52) U.S. Cl.
USPC ..................................................... 244/123.1

(58) Field of Classification Search
USPC ........... 244/49, 219, 123.1, 123.11, 5, 11, 22, 244/28, 218
See application file for complete search history.

(56) References Cited

U.S. PATENT DOCUMENTS

| | | | |
|---|---|---|---|
| 1,048,835 A | 12/1912 | Hyde et al. | |
| 1,881,034 A | 10/1932 | Smith et al. | |
| D144,067 S | 3/1946 | Paglia | |
| 2,643,076 A | 6/1953 | Hurel | |
| 2,783,955 A * | 3/1957 | Fitz Patrick | 244/22 |
| 3,025,027 A | 3/1962 | Ferreira | |
| 3,089,670 A | 5/1963 | Johnson | |
| 3,463,420 A * | 8/1969 | Carter | 244/46 |
| 3,473,761 A * | 10/1969 | Chutter | 244/119 |
| 4,262,864 A | 4/1981 | Eshoo | |
| 4,361,295 A | 11/1982 | Wenzel | |
| 4,364,532 A | 12/1982 | Stark | |
| 4,415,133 A | 11/1983 | Phillips | |
| 4,725,021 A * | 2/1988 | Priddy | 244/123.11 |
| 4,858,854 A * | 8/1989 | Jacobson | 244/123.11 |
| 5,810,284 A | 9/1998 | Hibbs et al. | |
| 6,015,115 A * | 1/2000 | Dorsett et al. | 244/219 |
| 6,347,769 B1 * | 2/2002 | To et al. | 244/219 |
| 7,198,225 B2 | 4/2007 | Lisoski et al. | |
| 7,331,546 B2 * | 2/2008 | Ifju et al. | 244/123.1 |
| 7,918,421 B2 * | 4/2011 | Voglsinger et al. | 244/219 |
| 2009/0206196 A1 * | 8/2009 | Parks et al. | 244/49 |
| 2010/0294893 A1 * | 11/2010 | Heintze et al. | 244/219 |

OTHER PUBLICATIONS

"A Preliminary Study of Solar Powered Aircraft and Associated Power Trains: NASA Contract Report 3699"; David W. Hall, et al.; Dec. 1983; see pp. 118-124.

(Continued)

*Primary Examiner* — Valentina Xavier
(74) *Attorney, Agent, or Firm* — Katten Muchin Roseman LLP

(57) ABSTRACT

A wing load alleviation structure for use on an aircraft, comprising a front spar, wherein the front spar includes a plurality of alternating rigid spar structures and inflatable spar structures; and a rear spar, wherein the rear spar includes a plurality of alternating rigid spar structures and pivot joints, such that when a load is applied to the front and rear spars, deflection of each of the front and rear spars continues at a first rate until a critical load is reached, and then as the loading increases, deflection of each of the front and rear spars continues at a second rate.

27 Claims, 24 Drawing Sheets

(56) References Cited

OTHER PUBLICATIONS

"Study of the Aerodynamics of a Small UAV Using AVL Software"; Paul Dorfman; Apr. 24, 2006.

"Gust Load Conditions for Fatigue Tests Based on a Continuous Gust Concept"; J.B. de Jonge, et al., Jan. 13, 1997.

* cited by examiner

WING LOAD ALLEVIATION STRUCTURE

PRIORITY INFORMATION

The present application claims priority under 35 U.S.C. §119(e) to U.S. Provisional Patent Application Ser. No. 60/943,740, filed Jun. 13, 2007, the entire contents of which are herein expressly incorporated by reference.

This invention was made with government support under W31P4Q-07-C-0296 awarded by the US Army Aviation & Missile Command. The government has certain rights in the invention.

BACKGROUND OF THE INVENTION

1. Field of the Invention

The invention relates to light weight aircraft. More particularly, the invention is related to a system and method for eliminating or substantially reducing wing peak loads and/or damage in a light weight aircraft.

2. Background Art

Large, low wing-loading aircraft, in particular solar powered aircraft, can have very high structural loads in gusts when operating at low altitude. They can also have structural dynamics problems, such as the one that led to the loss of the Helios aircraft. Wing loading, as those of ordinary skill in the art know, is the loaded weight of the aircraft divided by the area of the wing. It is broadly reflective of the aircraft's lift-to-mass ratio, which affects its rate of climb, load-carrying ability, and turn performance.

Typical aircraft wing loadings range from about 10 lb/ft$^2$ (100 kg/m$^2$) for general aviation aircraft, to 80 to 120 lb/ft$^2$ (390 to 585 kg/m$^2$) for high-speed designs like modern fighter aircraft. The critical limit for bird flight is about 5 lb/ft$^2$ (25 kg/m$^2$). A low wing loading aircraft, therefore, is typically in the range of about 1 lb/ft$^2$ to about 20 lb/ft$^2$.

Wing loading has an effect on an aircraft's climb rate. A lighter loaded wing will have a superior rate of climb compared to a heavier loaded wing as less airspeed is required to generate the additional lift to increase altitude. A lightly loaded wing has a more efficient cruising performance because less power is required to maintain lift for level flight.

While the low power requirements of a light wing loading airplane are desirable for high altitude, long endurance aircraft, the resulting low flight speed means that the aircraft can be subjected to very large gust loads when it is flying in dense air at low altitudes. In particular, the speed of the wind gusts may be greater than the airspeed of the airplane. Also, these aircraft can be quite large, and may even have a wingspan larger than the cell size of the low altitude turbulence. This can produce uneven loads on the wing, and require especially strong wing spars to withstand the loads. Making the spars stronger to withstand the additional wind gust loads adds weight to what would otherwise be a very light weight, highly efficient airplane Thus, a need exists for a wing structure on a light weight aircraft that can handle relatively large, and perhaps localized, gusts with respect to the wing area, without permanent bending or damage to the wing structure.

SUMMARY OF THE INVENTION

It is therefore a general aspect of the invention to provide a wing structure that will obviate or minimize problems of the type previously described. According to a first aspect of the preset invention, a wing structure for use on an aircraft is provided comprising: a front spar, wherein the front spar includes at least one rigid front spar structure and at least one inflatable spar structure positioned inboard of the at least one rigid front spar structure; and a rear spar, wherein the rear spar includes at least one rigid rear spar structure and a pivot joint positioned inboard of the at least one rigid spar structure.

According to the first aspect, when a load is applied to the wing structure, for a first range of load values, deflection occurs for each of the at least one rigid front spar and each of the at least one rigid rear spar within a first range of deflection values, and for a second range of load values, deflection occurs for each of the at least one rigid front spar and the at least one rigid rear spar within a second range of deflection values, such that a minimum ratio of load values to deflection values within the first range of deflection values is greater than a maximum ratio of load values to deflection values within the second range of deflection values.

According to the first aspect, within the first range of load values, a first ratio of load values to deflection values is substantially constant, and within the second range of load values, a second ratio of load values to deflection values is substantially constant. According to the first aspect, the second range of deflection values corresponds to a range of load values within which a metal spar would bend, and the second range of deflection values corresponds to a range of load values within which a spar built from composite materials would break.

According to the first aspect, the at least one inflatable spar structure is positioned at between about 25% and 75% of a distance from a fuselage of the aircraft to a wing tip of the wing structure, and the at least one inflatable spar structure is positioned at about 50% of a distance from a fuselage of the aircraft to a wing tip of the wing structure.

According to the first aspect, a number of inflatable spar structures of the front spar and a number of pivot joints of the rear spar are equal, such that for each of the front inflatable spar structures there is a corresponding one of the rear pivot joints, and further wherein, each pivot joint of the rear spar is located at a first position that is substantially perpendicular from its corresponding inflatable spar structure of the front spar, or each pivot joint of the rear spar is located at a second position that is inboard of the first position.

According to the first aspect, an effective hinge line is formed by each inflatable spar structure and corresponding pivot joint, such that when deflection occurs, each of an outermost front rigid spar and an outermost rigid rear spar bends about the effective hinge line.

According to the first aspect, the effective hinge line is formed at an angle of between about 0° and 45° with respect to the effective hinge line when the pivot joint is positioned at the first position, and the effective hinge line is formed at an angle of about 30° with respect to the effective hinge line when the pivot joint is positioned at the first position.

According to the first aspect, when an applied load on the wing structure exceeds a predetermined minimum threshold, each of the at least one inflatable spar structure and the at least one pivot joint is configured to bend substantially similarly, and thus to twist an outermost rigid front spar and an outermost rigid rear spar, such that the outermost front rigid spar of the wing structure has a lower elevation than the outermost rigid rear spar of the wing structure.

According to the first aspect, when the load is reduced from a first value within the second range of load values to a second value within the first range of load values, the wing structure recovers to an original form.

According to a second aspect of the present invention, an aircraft is provided comprising: a fuselage; at least one vertical control surface appended to the fuselage; at least one horizontal control surface appended to the fuselage; and a wing structure, wherein a first portion of the wing structure is configured to elastically deform under a sufficient bending load to a first deformation point, such that the first portion of the wing structure generates reduced lift while deformed, and wherein when the sufficient bending load is removed, the wing structure is configured to restore itself to its original shape.

According to the second aspect, the wing structure can deform and restore itself multiple times without breaking or failing permanently, and when the first portion is elastically deformed under a sufficient bending load, an angle of attack of the first portion with respect to an airflow is reduced.

According to the second aspect, the first portion of the wing structure comprises: a substantially flexible component joined to the fuselage; and a substantially stiff component joined to the substantially flexible component.

According to the second aspect, the substantially flexible component comprises: a pneumatic structure, filled with a gas, and an inflatable spar structure.

According to the second aspect, the substantially flexible component structure comprises: a flexible apparatus, configured to flex in at least two directions, and a motor driven apparatus configured to restore the first portion of the wing structure to its original shape in the absence of the sufficient bending moment.

According to a third aspect of the present invention, an aircraft is provided, comprising: a fuselage; at least one vertical control surface appended to the fuselage; at least one horizontal control surface appended to the fuselage; a right wing structure for use on the aircraft, wherein the right wing structures includes a front spar, wherein the front spar includes at least two front right rigid spar structures and an inflatable right spar structure positioned between the at least two front right rigid front spar structures, and a rear spar, wherein the rear spar includes at least two rear right rigid spar structures and a pivot joint positioned between the at least two rear right rigid rear spar structures; a centerline inflatable spar structure, positioned over a centerline of the aircraft, wherein a right side of the centerline inflatable spar structure is attached to a most inboard front right rigid spar structure; and a left wing structure for use on the aircraft, wherein the left wing structures includes a front spar, wherein the front spar includes at least two front left rigid spar structures and an inflatable left spar structure positioned between the at least two front left rigid front spar structures, and a rear spar, wherein the rear spar includes at least two rear left rigid spar structures and a pivot joint positioned between the at least two rear left rigid rear spar structures, wherein a left side of the centerline inflatable spar structure is attached to a most inboard front left rigid spar structure.

According to the third aspect, when a load is applied to the wing structure, for a first range of load values. deflection occurs for each of the at least one rigid front spar and each of the at least one rigid rear spar within a first range of deflection values, and for a second range of load values, deflection occurs for each of the at least one rigid front spar and the at least one rigid rear spar within a second range of deflection values, such that a minimum ratio of load values to deflection values within the first range of deflection values is greater than a maximum ratio of load values to deflection values within the second range of deflection values.

According to the third aspect, within the first range of load values, a first ratio of load values to deflection values is substantially constant, and within the second range of load values, a second ratio of load values to deflection values is substantially constant.

According to the third aspect, the second range of deflection values corresponds to a range of load values within which a metal spar would bend, and the second range of deflection values corresponds to a range of load values within which a spar built from composite materials would break.

According to the third aspect, the at least one inflatable spar structure is positioned at between about 25% and 75% of a distance from a fuselage of the aircraft to a wing tip of the wing structure, and the at least one inflatable spar structure is positioned at about 50% of a distance from a fuselage of the aircraft to a wing tip of the wing structure.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

Figure 1:
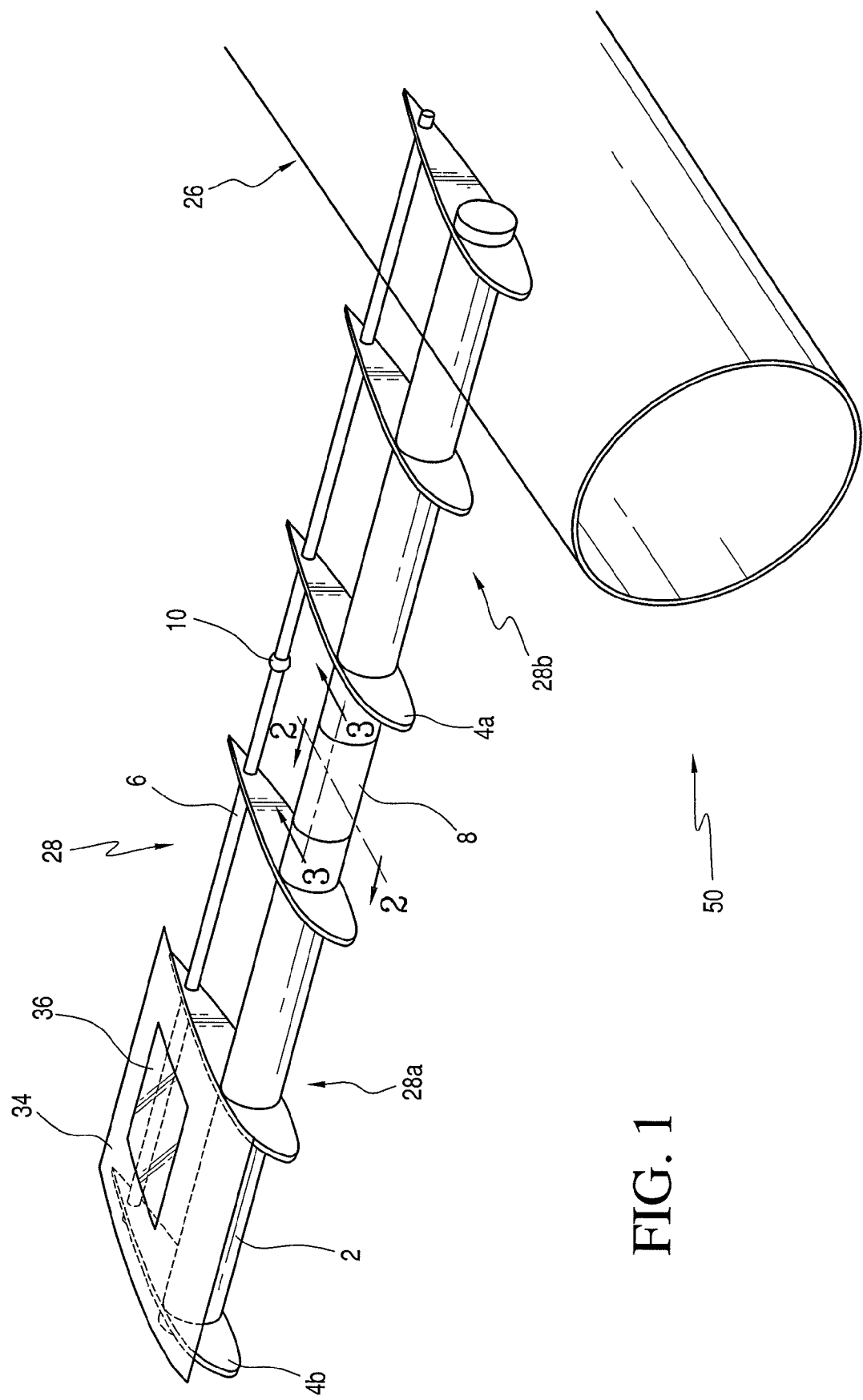
FIG. 1 illustrates a wing segment showing front and rear spars, with a wing loading alleviation structure comprising an inflatable spar segment in the front spar according to an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

Light weight aircraft 50, according to exemplary embodiments, are defined as those aircraft weighing less than about 5,000 pounds or less. Referring to FIG. 1. wing segment 28 is shown comprising front spar 2, rear spar 6, and inflatable spar segment 8, with inflatable spar segment 8 located as part of front spar 2 according to an exemplary embodiment. Light weight solar aircraft 50 requires relatively rigid wing panels 34 (only one is shown in FIG. 1, the rest being omitted for purposes of clarity and brevity; and none are shown in the other drawings figures) to support solar arrays 36 (only one is shown in FIG. 1, the rest being omitted for purposes of clarity and brevity; and none are shown in the other drawings figures), and tend to have front and rear spars 2, 6 made from carbon fiber or other similar composite materials. As those of ordinary skill in the art can appreciate, however, many different types of materials can be used to make front and rear spars 2, 6, including, for example, aluminum, plastics, among other types of materials, or combinations thereof. Front and rear spars 2, 6 are quite strong, but can fail catastrophically, as discussed in greater detail below. The exemplary embodiment makes use of the non-catastrophic overload capability of inflatable tubular spar segments (inflatable spar segments) 8 to make a self-healing aircraft.

According to an exemplary embodiment, light weight solar aircraft 50 has a gross weight of about 750 kilograms (kgs), a nominal operational altitude of about 80,000', a true air speed (TAS) minimum requirement of about 60 knots, and a wing span of about 60 meters.

Wing 28 comprises of a series of rigid panels (panels) 34, each with their associated solar array 36. According to an exemplary embodiment, wing 28 is divided into wing panel outer portion (outer portion) 28a, and wing panel inner portion (inner portion) 28b. Wing outer portion 28b and wing inner portion 28b are separated by inflatable spar segment 8 and pivot (or hinge) 10. According to a preferred embodiment, the relatively short section of standard inflatable spar segment 8 comprises a combination of a gas tight bladder, a braided fiber tube (to take torsion and shear loads), and uni-directional fiber caps (to take tension and bending loads). According to other exemplary embodiments, other configurations and combinations of materials can be used to substantially similar effect. The gas tight bladder is pressurized to put the caps into an appropriate tension preload.

Figure 2:
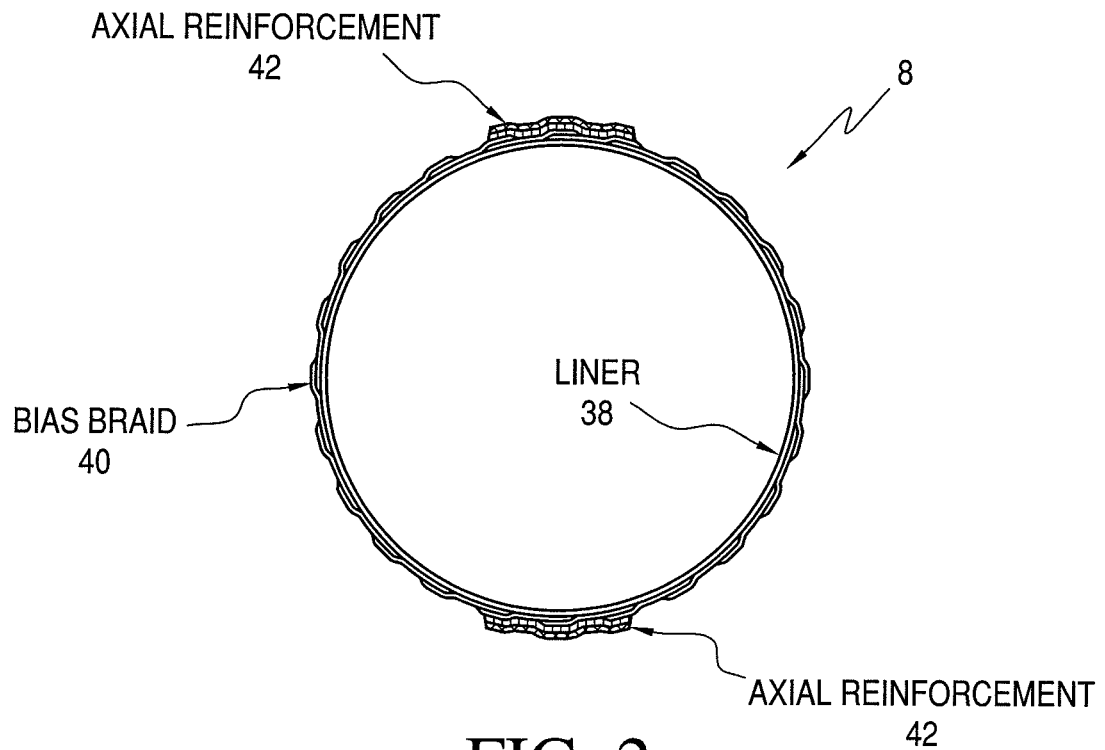
FIG. 2 illustrates a cross sectional view of the inflatable spar segment shown in FIG. 1.
Figure 3:
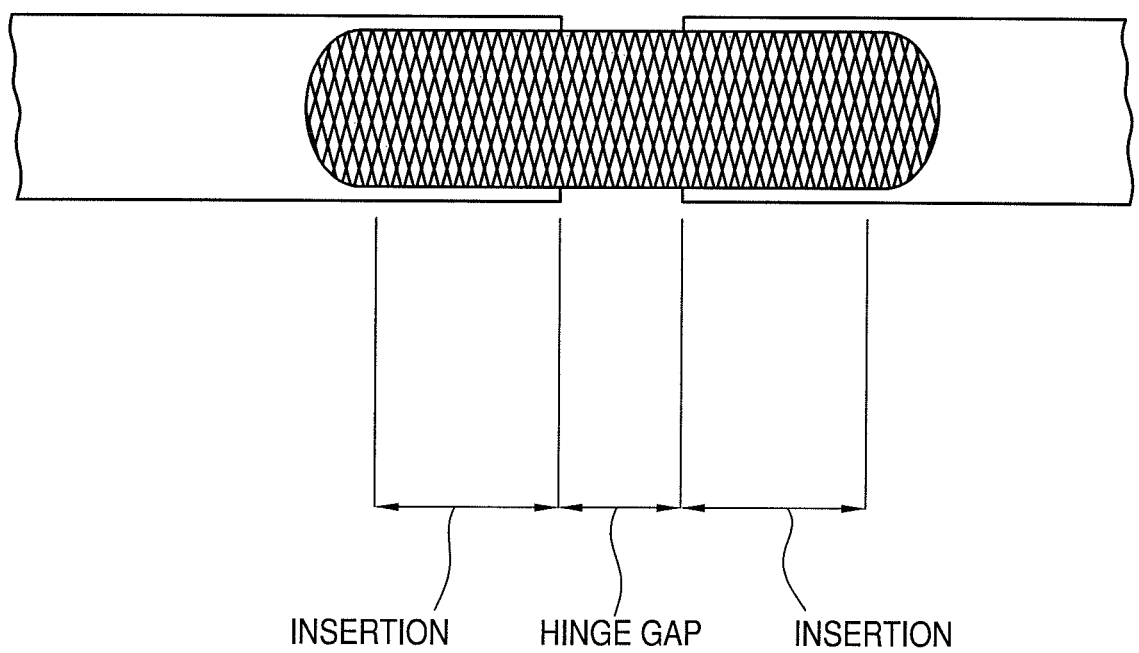
FIG. 3 illustrates a view along lines 3-3 in FIG. 1 of the inflatable spar segment within the front spar.

FIG. 2 illustrates a cross sectional view along lines 2-2 of inflatable spar segment 8 as shown in FIG. 1, and FIG. 3 illustrates a view along lines 3-3 of inflatable spar segment 8 also as shown in FIG. 1. According to an exemplary embodiment, inflatable spar segment 8 comprises gas barrier (bladder, or, preferably, liner) 38, bias braid fiber layer (bias braid) 40, and axial fiber reinforcement (axial reinforcements) 42, as illustrated in FIG. 2. Liner 38 functions mainly to retain the inflation gas and has only limited structural function in maintaining rigidity of wing panel 28. According to an exemplary embodiment, liner 38 is generally manufactured as a single ply, 2-D tubular braid. Its primary function is to resist hoop stress up to an adequate margin above working pressure. It also provides torsion and shear stiffness.

Bias braid 40 is formed about an outer surface of liner 38, and provides significant structural rigidity to inflatable spar segment 8. Liner 38 functions similarly to an inner tube in an older-style tire, and bias braid 40 is similar to the outer tire. According to an exemplary embodiment, bias braid 40 is made of a high strength and high durability fiber such as Kevlar® or Vectran®. Located on an uppermost and bottommost portion of inflatable spar segment 8 are axial reinforcements 42.

According to an exemplary embodiment, axial reinforcements 42 are usually straps, ribbon, or webbing, that is bonded to one or more surfaces surface of bias braid 40. In FIG. 2, axial reinforcements 42 have been added to an upper outer surface of bias braid 40, and to a lower outer surface of bias braid 40. It is primarily axial reinforcement 42 that determines the bending stiffness of wing panel 28, and, in combination with inflation pressure, the wrinkle onset (buckling) moment.

Figure 5:
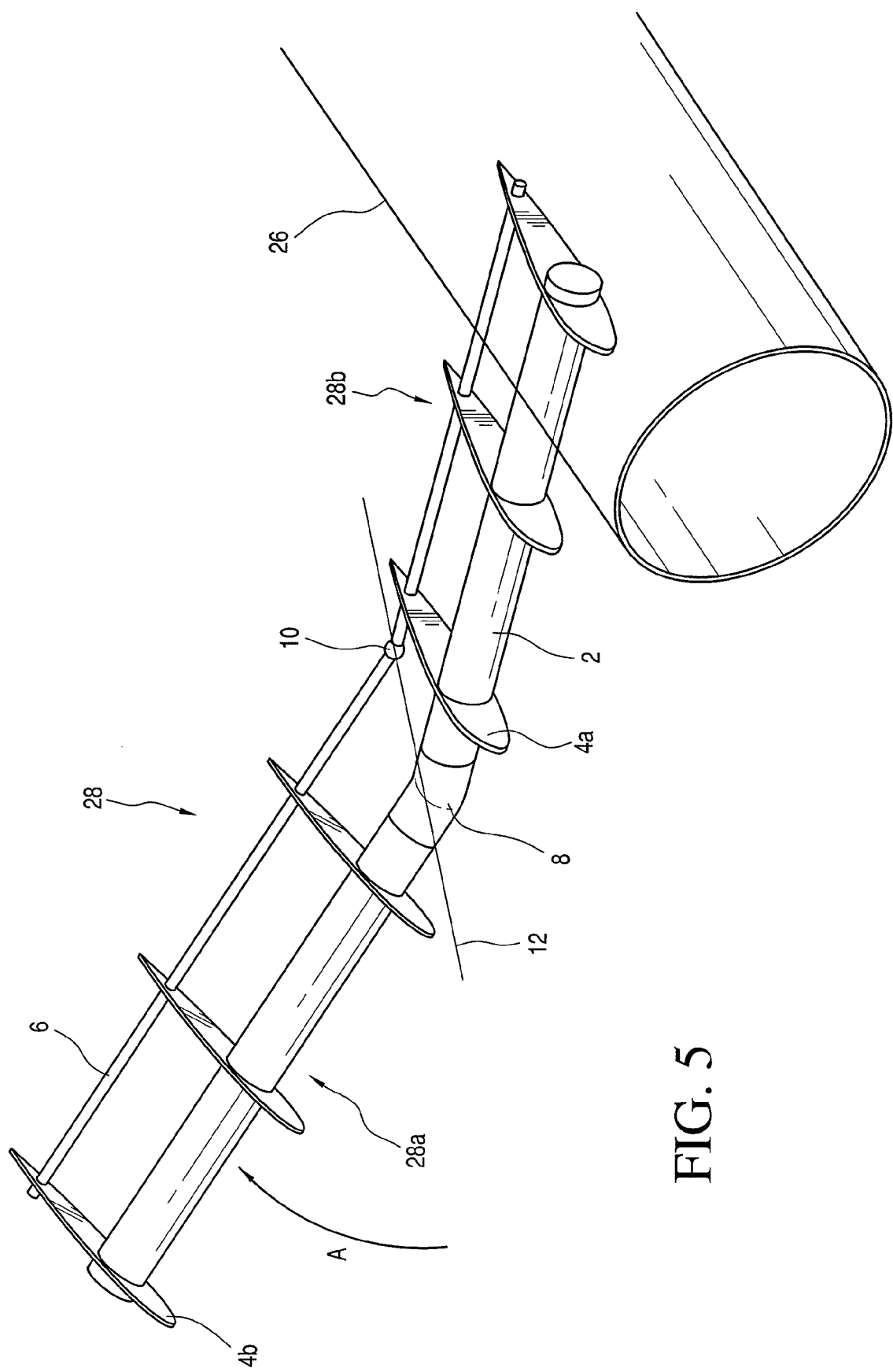
FIG. 5 illustrates the same wing segment as shown in FIG. 1, but as deflected during an encounter with a strong gust according to an embodiment of the present invention.
Figure 7:
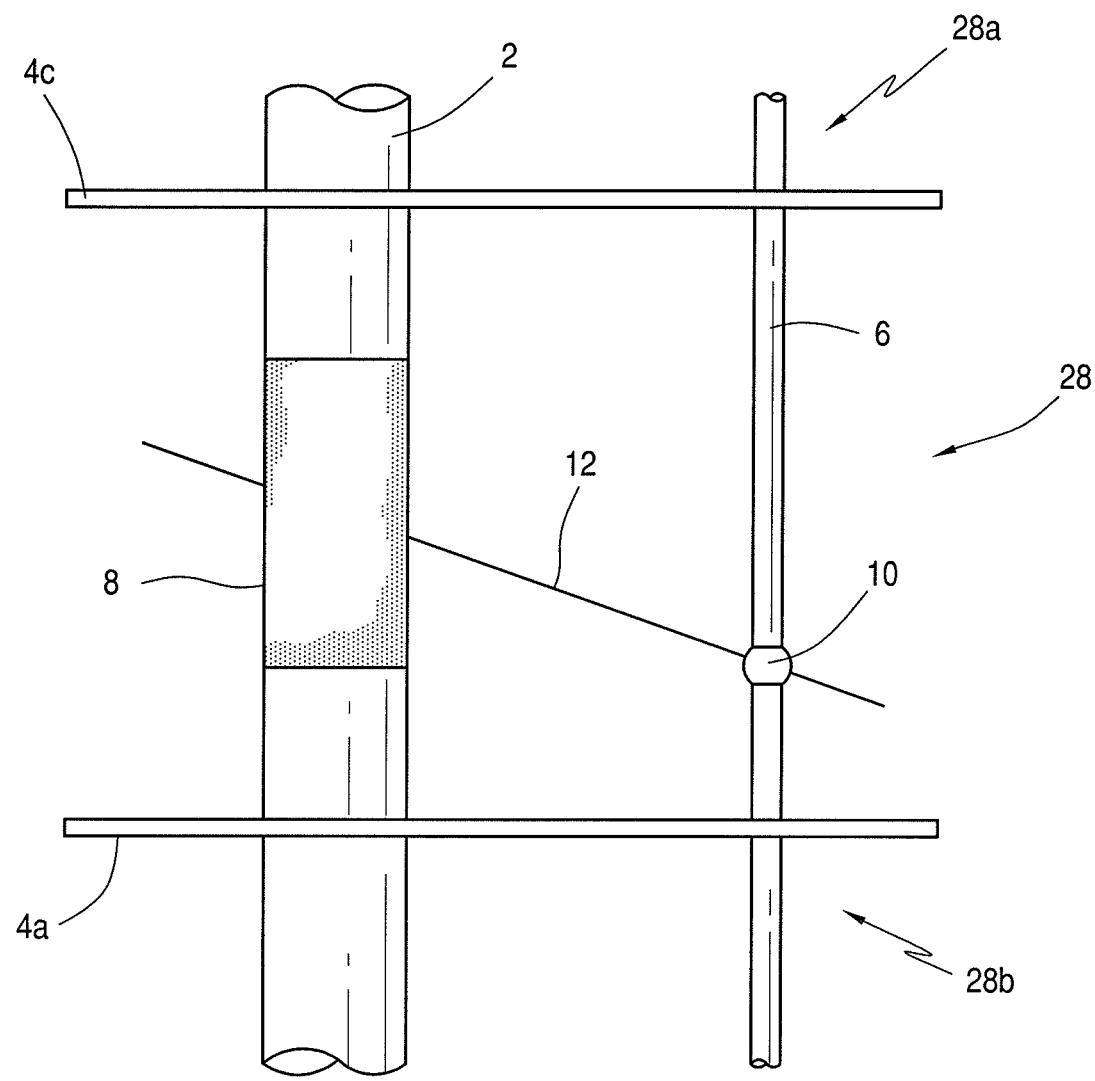
FIG. 7 illustrates a portion of main composite tube spars, ribs and an inflatable spar segment of a wing, as well as a line that represents an effective hinge line for the motion of the outer wing as it is deflected by a strong gust load according to an embodiment of the present invention.
Figure 9:
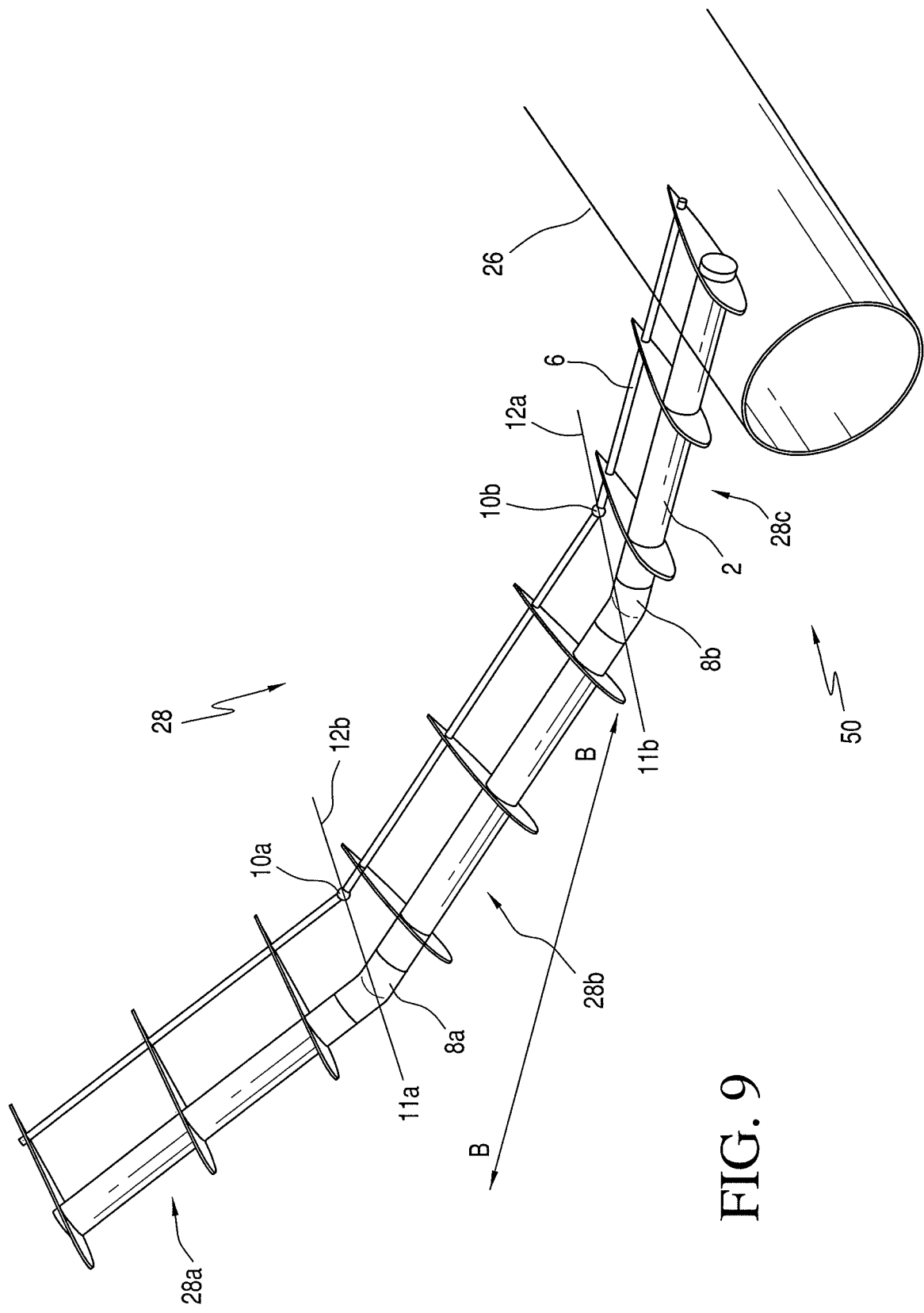
FIG. 9 illustrates a substantially identical wing segment as shown in FIG. 1, but with three wing panels, and wherein each of the outer two wings panels are deflected as during an encounter with a strong gust according to an embodiment of the present invention.

Hinge 10 forms the rear pivot point on rear spar 6, as shown in FIGS. 5 and 7 (and discussed in greater detail below). According to an exemplary embodiment, hinge 10 can also be an inflatable hinge device. Alternatively, according to additional embodiments, omni-directional hinges (ball joints) can be used in place of hinge 10. The skins of rigid panels 34 are comprised of some suitable type of flexible membrane that is connected to the end ribs 4 of the adjacent rigid panels 34. According to an exemplary embodiment, inflatable spar segment 8 can be located in about the middle of wing panel 28, or there can be more than one inflatable spar segments 4 and hinges 10 located at various points on wing panel 28 to couple multiple wing segments 28 to each other, as shown in FIG. 9. FIG. 9 illustrates a substantially identical wing segment 28 as shown in FIG. 1, but with three wing panels 28a, b, c, and wherein each of the outer two wings panels 28a, b are deflected as during an encounter with a strong gust according to an embodiment of the present invention. Line B-B represents the non-deflection mode of wing 28 on aircraft 50. Deflection of inflatable spar segment 8 and wing panel 28 is now discussed in greater detail.

Figure 4:
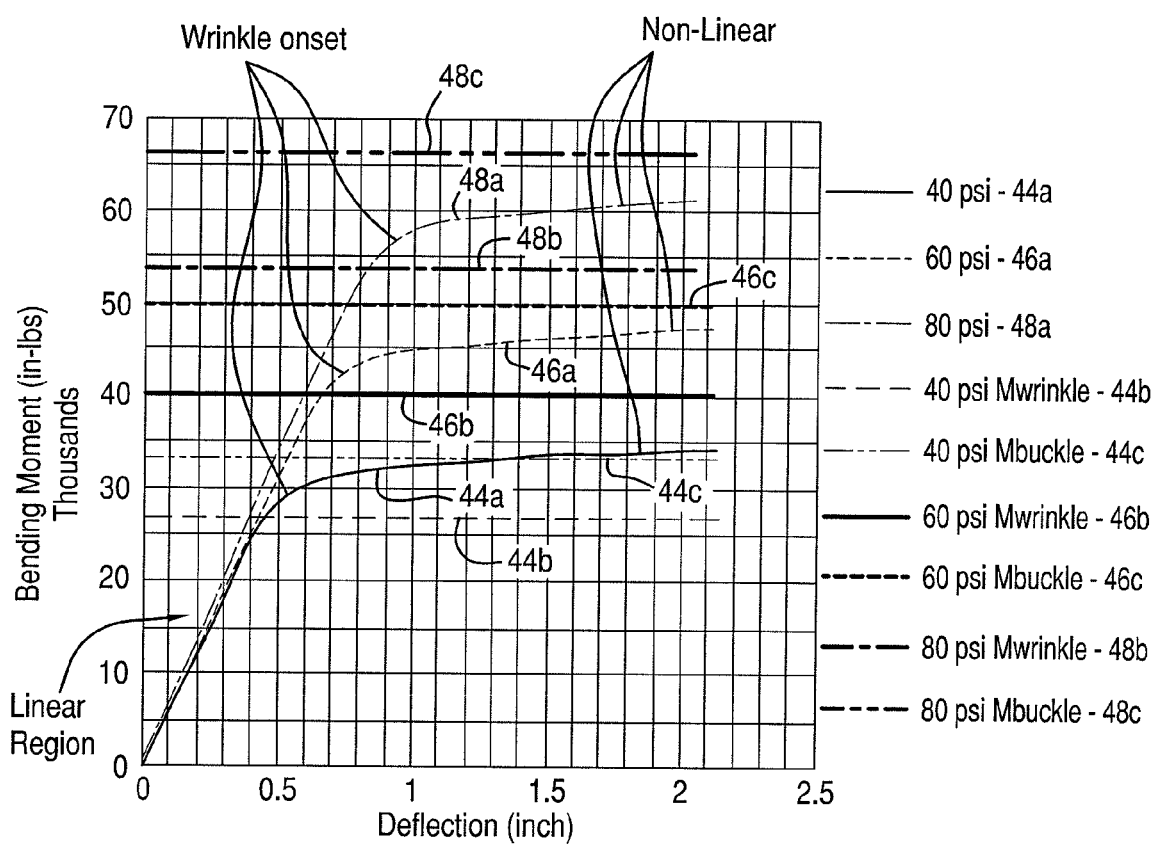
FIG. 4 illustrates experimental test data for the inflatable spar segment shown in FIG. 1 of bending moment vs. deflection.

FIG. 4 illustrates experimental test data for the inflatable spar segment shown in FIG. 1 of bending moment vs. deflection. For each pressure setting (approximately 40 PSI, 60 PSI, and 80 PSI) there is a range of bending moment for which the deflection response is linear. Characteristics of the linear range are: (a) the fiber reinforcement has net tension in all fibers, i.e. they are not wrinkled; (b) bending stiffness, the slope of the deflection curve, quantified by the value of EI, which is the stiffness of the fibers times the section moment of inertia of the caps can be calculated as if the structure were rigid—e.g. all fibers lie on the surface of the cylinder; (c) there is substantially little or no volume change over this range of deflection; and (d) the load at which deflection departs from linear marks wrinkle onset. Wrinkle onset for each of the different inflatable spar segment pressurizations is shown in FIG. 4. At an applied bending greater than wrinkle onset, the deflection response becomes non-linear and has the following characteristics: (a) some reinforcing fibers are without tension, i.e. wrinkled; (b) bending stiffness is reduced, but bending reaction does not decrease; (c) volume changes with deflection (the pressurization curves created in FIG. 1C were obtained from a relatively large volume structure and inflation pressure was regulated to remain constant); and (d) there is a theoretical maximum reaction (deflection), which the curve may approach, but will not exceed. The 40 PSI inflatable spar segment pressurization curve (40 PSI pressurization curve) 44a indicates that for the particular sized inflatable spar segment 8 that was used in creating the bending moment data, an applied moment in the range from 0 to about 30 in-lbs produced linear results. At about 30 in-lbs, wrinkle onset began, and just after about 30 in-lbs, applied moments produced non-linear responses. That is, small amounts of applied moments produced significant deflection, as shown in the non-linear region of the 40 PSI pressurization curve 44a. According to an exemplary embodiment, 40 PSI mwrinkle curve 44b indicates the estimate of the bending moment where wrinking will begin, and 40 PSI mbuckle curve 44c indicates the estimated maximum moment that the fully wrinkled spar is capable of producing.

According to an exemplary embodiment, the 60 PSI inflatable spar segment pressurization curve (60 PSI pressurization curve) 46a indicates that for the particular sized inflatable spar segment 8 that was used in creating the bending moment data, an applied moment in the range from 0 to about 42 in-lbs produced linear results. At about 42 in-lbs, wrinkle onset began, and just after about 42 in-lbs, applied moments produced non-linear responses. That is, small amounts of applied moments produced significant deflection, as shown in the non-linear region of the 60 PSI pressurization curve 46a. According to an exemplary embodiment, Mwrinkle curve 46b and Mbuckle curve 46c are similar to curves 44b and 44c discussed above, but with 60 psi pressure.

The 80 PSI inflatable spar segment pressurization curve (80 PSI pressurization curve) 48a indicates that for the particular sized inflatable spar segment 8 that was used in creating the bending moment data, an applied moment in the range from 0 to about 56 in-lbs produced linear results. At about 56 in-lbs, wrinkle onset began, and just after about 56 in-lbs, applied moments produced non-linear responses. That is, small amounts of applied moments produced significant deflection, as shown in the non-linear region of the 80 PSI pressurization curve 48a. According to an exemplary embodiment, Mwrinkle and Mbuckle curves are similar to curves 44b and 44c, discussed above, but at 80 psi pressure.

FIG. 5 illustrates the same wing segment 28 as shown in FIG. 1, but this time, as deflected during an encounter with a strong gust according to an According to an exemplary embodiment. Inflatable spar segment 8 has wrinkled on its upper surface, and allowed outer portion 28a to move upwards (in the direction of arrow A). The angle of effective hinge line 12 (as shown in greater detail in FIG. 7) means that as outer portion 28a deflects upwards, it rotates in pitch such as to lower the angle of attack on the outer wing 28a (i.e., the front edge of outer portion 28a is lower than the trailing edge of outer portion 28b). The result of the deflection of outer portion 28a can be seen with greater clarity in FIG. 8.

Figure 8:
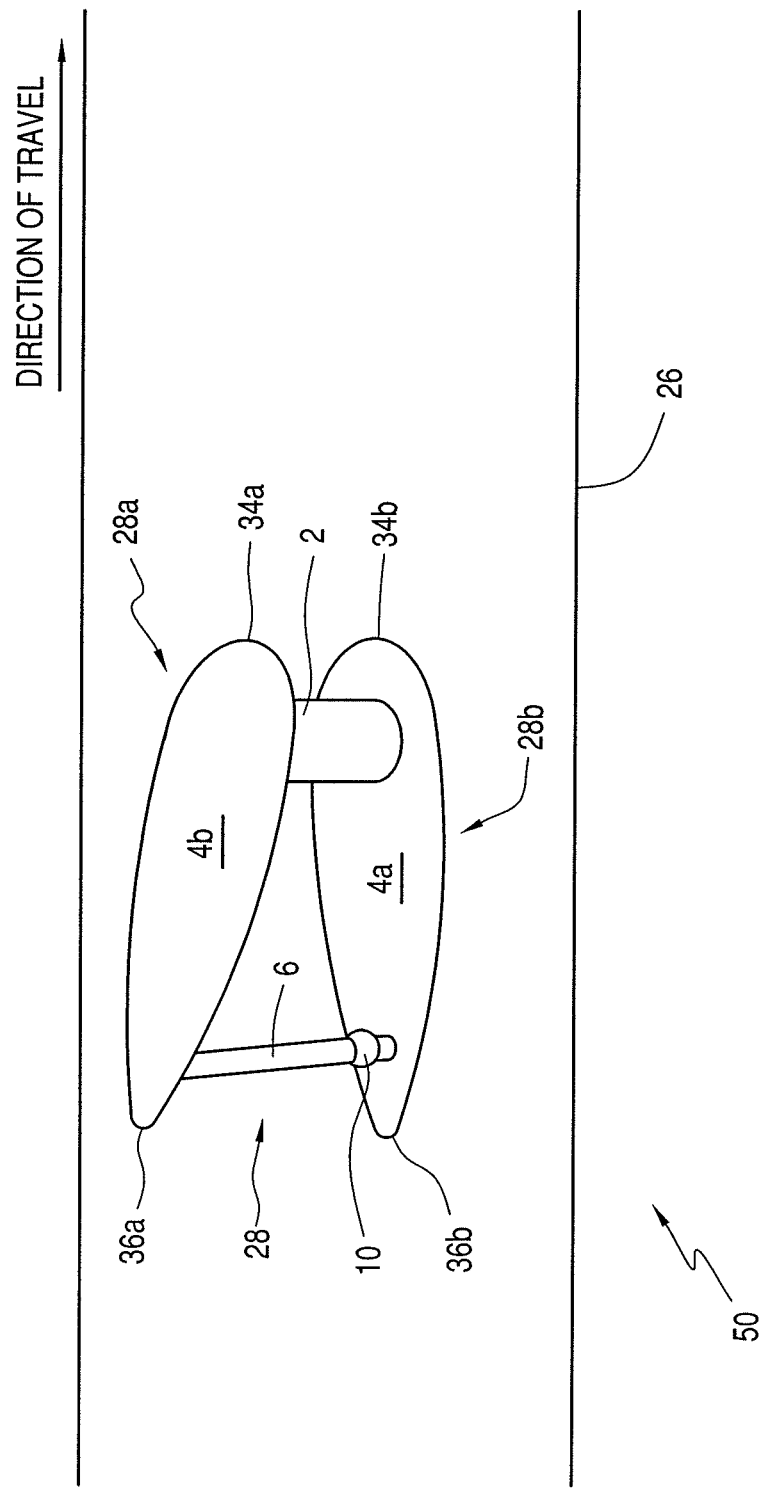
FIG. 8 illustrates a side view of the wing segment shown in FIG. 5.

In FIG. 8, which is a side view of aircraft 50 and wing panel 28, it can be seen that leading edge 34a of outer portion 28a (which has deflected upwards) is lower (i.e., pointing downwards) with respect to trailing edge 36a of outer portion 28a. Note that leading edge 34b of inner portion 28b and trailing edge 36b of inner portion 28b have not shifted, and are substantially level. According to an exemplary embodiment, the rotation in pitch of outer portion 28a results in a lowering of the angle of attack of outer portion 28a, and this reduction in angle reduces the lift and thus the load on spars 2, 4. When the gust passes, the restoring moment of the inflatable section 4 causes wing panel 28 to return to its normal shape.

As briefly discussed above, FIG. 7 illustrates a segment of outer portion 28a and inner portion 28b, at the location on inflatable spar segment 8 and hinge 10. Inflatable spar segment 8 can, according to an exemplary embodiment, buckle substantially near its center, creating effective hinge line 12 from inflatable spar segment 8 to hinge 10. Effective hinge line 12 therefore comprises an effective pivot point of inflatable spar segment 8 (the point or general area on inflatable spar segment 8 wherein it buckles). As shown in FIG. 9 (discussed briefly above), wing panels 28 that comprise multiple wing panels 28a, b, c (or more) will have multiple effective pivot points for each inflatable spar segment 8. Hinge 10, located on rear spar 6, is illustrated as a sphere, with the pivot point at the center of the sphere. According to exemplary embodiments, hinge 10 can also be an omni-directional hinge device that is not-inflatable, a ball joint type pivot, a piece of an elastomer (which is a polymer with the property of elasticity), rubber, or other synthetic or natural materials (e.g., leather) that can flex and bend in multiple directions, among other materials.

According to an exemplary embodiment, effective hinge line 12 hinges outer portion 28a with respect to inner portion 28b, as outer portion 28a is deflected by a strong gust load. The location of inflatable spar segment 8 and hinge 10 provides outer portion 28a with the capability of changing its angle of attack during the high deflection, post buckling mode. This provides wing panel 28, and hence aircraft 50, with aeroelastic stability. The location and angle of effective hinge line 12 affects the manner in which outer portion 28a deflects upwards with respect to inner portion 28b, and the duration of its deflection. The manner and duration of deflection as function of location and angle of effective hinge line 12 is discussed in greater detail below. According to a preferred embodiment, the aft pivot point (i.e., inflatable pivot 10) is more inboard than the virtual center of the main spar buckling motion (inflatable spar segment 8, and effective hinge line 12), and any upward motion of outer portion 28a results in a decreased angle of attack, that lowers the lift of the outer portion 28a, and thus lowers the lift force on the outer wing. This lower lift force reduces the typical deflection of the wing in a gust.

Figure 6:
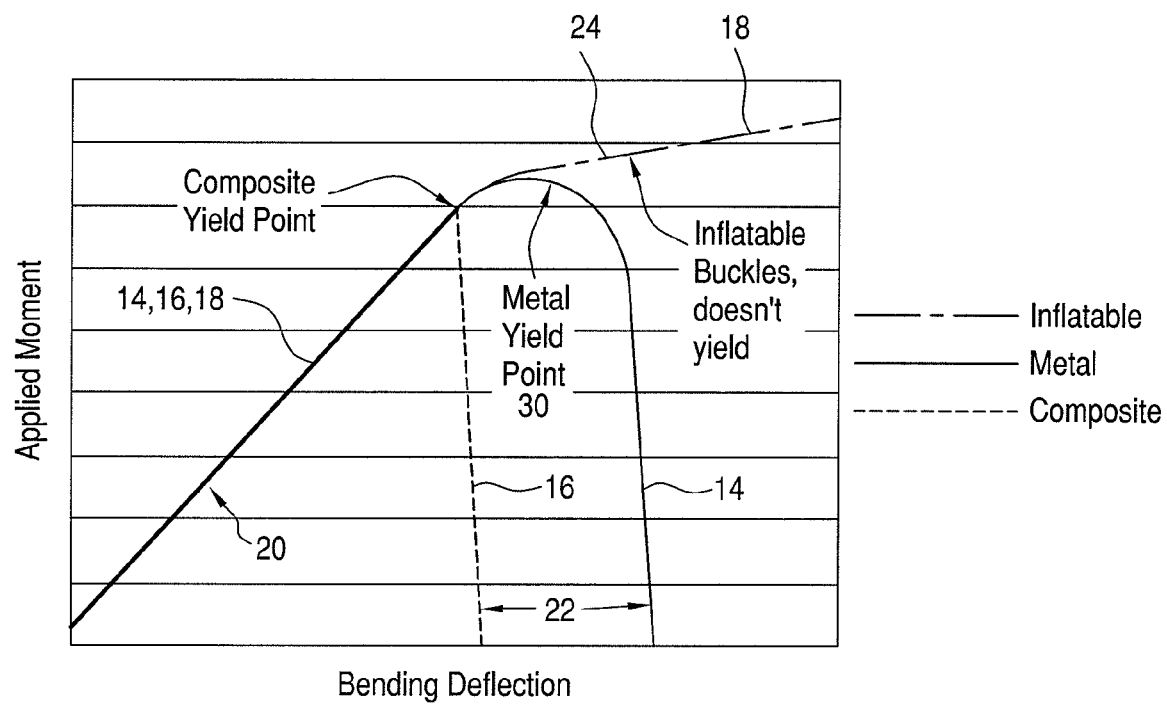
FIG. 6 illustrates a notional plot of the moment vs. deflection curves for various spar types, illustrating that, for an inflatable segment spar, the deflection vs. moment is linear for a substantial region but when it reaches its design limit load, the slope of the curve changes, but it always has positive slope, and more moment is required to increase the deflection according to an embodiment of the present invention.

FIG. 6 is a notional plot of the moment vs. deflection curves for various spar types. According to an exemplary embodiment, the spars are sized for the same failure load and deflection; this does not mean they are the same physical size or weight. In FIG. 3, the Y axis is applied moment, in N-m, or ft-lb, and the X axis is bending deflection (at the point the effective force is applied, in either meters, or feet). A linear line means that as the bending moment increases, the item to which the bending moment is applied is bending linearly; there is no buckling or non-linear response to the amount of applied force. Linear region 20 shows that for all three types of spar material—inflatable, metal and composite—for a good portion of the graph, the applied bending moment results in linear deflection of the spar, regardless of its composition.

Lines 14, 16 and 18, represent the metal curve (14), composite material curve (16) and inflatable material curve (18), and remain linear and aligned until the composite yield point. The "rate of bending" is the ratio of applied moment (or applied moment value) to the amount of bend. In the linear region 20, the rate is constant, meaning the wing panel 28 bends with a constant value for additional applied force. For example, if a first applied force of X N-m is applied to wing panel 28 results in a bend of 30 centimeters (cm), the an additional applied force of XN-m results in a bend of an additional 30 cm. Just beyond the composite yield point, the amount of applied bending moment becomes too much for the composite material, and the composite spar fails totally, and catastrophically. There is no yield region for the composite spar.

Metal curve 14 shows that the deflection vs. moment is linear (20) for a substantial region. As the load increases further, however, the metal begins to yield. Note that the yielding of the metal spar is different than that of the composite spar; the yielding of the metal spar is curvilinear; the additional bending moments results in more bending for a given load increase until the metal yield point 30 is reached. In this region, the moment vs. deflection curve allows the metal spar to have a permanent deformation after the load is removed, but some additional load is tolerable, allowing the wing to function, even though damage to the spar (and hence wing) is occurring and is not recoverable. At some further point with still more applied bending moment, the metal yield point 30 is surpassed, and then, with increased applied bending moment, the metal spar fails totally (at the catastrophic failure region 22), and can take no more applied bending moment. Not only can it take no further applied bending moment, the metal spar is irrevocably damaged, and can never recover.

The inflatable spar segment 8 bending moment curve, however, is also linear (18) for a good portion, but, according to an exemplary embodiment, when it reaches its design limit load, it simply buckles (buckle region 24) on its upper surface. The slope of the curve changes, but it always has positive slope (see curve 18, at the buckling region 24), and small amounts of applied moment increases the deflection disproportionately to that of the linear region (hence, "nonlinear"). When the load is reduced, the spar will follow essentially the same curve backwards, with continuously reducing deflection, until it is back in the linear region 20 of applied bending moment v. bending deflection.

Inflatable spar segment 8 has a linear load vs. deflection curve for loads up to the nominal peak bending moment. This is the same as a conventional metal or composite spar. However, when the peak load is exceeded, one of the spar caps is no longer in tension, and it will buckle. In the post buckling regime, according to an exemplary embodiment, the inflatable spar segment still supports bending moment due to the internal gas pressure, and the load vs. deflection curve still has positive slope (i.e. increasing deflection requires increasing load) or is at least horizontal, meaning it supports constant bending moment. In this region, the slope of the curve is much flatter. When the load is reduced below the nominal peak load, the spar returns to its original shape.

According to an exemplary embodiment, reduction of main spar weight is advantageously gained because the main spar does not have to handle worst case peak loads. Inflatable spar segment 8 acts to limit the bending moment at its location to its buckling load, and this serves to limit the bending load in rigid main spar 2 both inboard and outboard of inflatable spar segment 8.

As discussed above, the purpose of running the computer simulation was to determine and evaluate the design parameters in order to maximize the performance of aircraft 50a, b, that utilizes wing segments 28 with inflatable spar segments 8, hinge 10, and effective hinge line 12. There are several design considerations that were varied and tested in order to gauge their effect on the ability of wing segments 28 to withstand gusts, temporarily fail when gust loads became too great, and to then restore themselves completely to their original shape. Recovery (or restoration) from a failure condition, in and of itself, provides aircraft 50 designers with truly revolutionary and significant design tools hereto before unheard of. Furthermore, according to exemplary embodiments, it should be noted that the act of deformation of the wing structure leads to its eventual recovery occurring because of the design considerations involved in effective hinge line 12: by canting inwards effective hinge line 12, the leading edge of the "deformed" portion of the wing is lower than the trailing edge when that portion of the wing bends upwards, thereby decreasing the angle of attack and subsequently reducing lift, and hence the bending moment. Designing a wing that can deform and recover, repeatedly, for a substantial portion of expected flight conditions means the aircraft can be designed lighter (because high strength is no longer required), allowing more weight for payload and/or fuel. The design considerations include location and angle of effective hinge line 12; gap length of inflatable spar segment 8, insertion length of the inflatable spar segment (into the composite spars), inflation pressure, section diameter, bias angle, strap strength, and elongation at break. The test results are discussed in detail below.

Figure 10A:
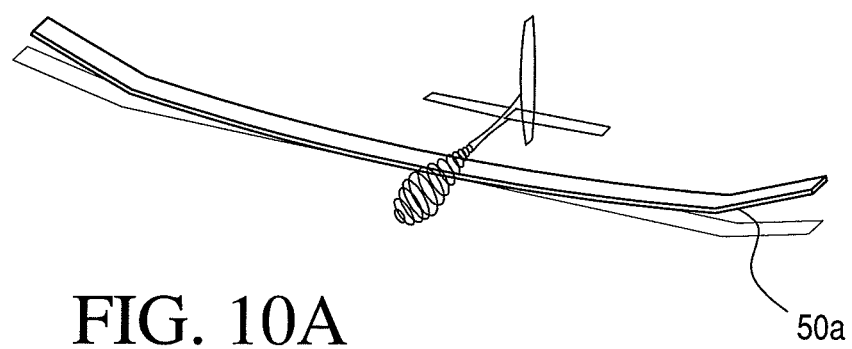
FIGS. 10A and 10B illustrate a flying wing aircraft employing a wing-load alleviation structure according to an embodiment of the present invention and a conventionally-configured aircraft respectively.
Figure 10B:
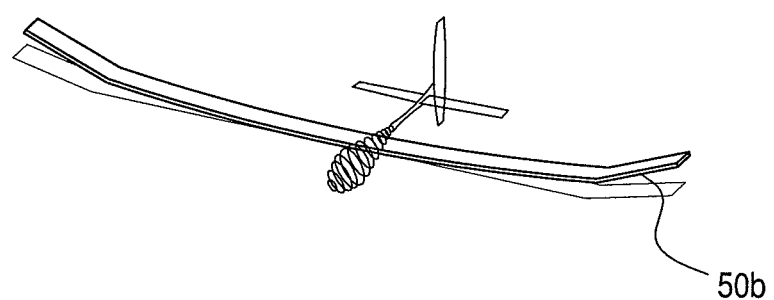

In order to determine optimum aircraft design configurations, computer simulations were run for two different plane types that illustrate use of inflatable spar segments 8 in wing panels 28, as shown in FIGS. 10A and 10B. The computer simulation software is known as "ASWing." Two models were created for the baseline ASWing analysis, a flying wing aircraft 50a and a conventional tailed aircraft 50b. Both were developed around the general requirements outlined above (i.e., 750 kg vehicle gross weight, etc.) and are representative of known spar/rib/flexible skin aircraft structures. For purposes of continuity, and to aid in comparison, both aircraft models 50a, 50b share the same wing spar structural properties, gross weight, and cruise altitude/speed. A depiction of each model (in 1 g flight) is shown in FIGS. 10A and 10B, and their respective general aircraft specifications can be found in Table 1, shown below:

TABLE I

|  | Flying Wing | Conventional Tailed |
|---|---|---|
| MTOW (kg) | 750 | 750 |
| b (m) | 66 | 60 |
| c (m) | 2.87 | 2.61 |
| AR | 23 | 23 |
| S (m$^2$) | 188 | 156 |
| $C_L$ | 1.0 | 1.2 |
| TAS (m/s) | 42 | 42 |
| Re | 367000 | 333000 |
| Section | LA 2573a | L7769 |

Each aircraft 50a, 50b has a 26% structural mass fraction (i.e., the structure of the aircraft accounts for 26% of its total mass, or about 195 kgs). The bulk of this mass (20%) is assigned to the wing, with smaller allotments for the fuselage and the tail in the case of the conventional tailed aircraft. For both models, additional point masses were added along the fuselage to balance the aircraft and reach the nominal mean take-off weight (MTOW) of about 750 kg used for the comparison.

Figures 11A, 11B:
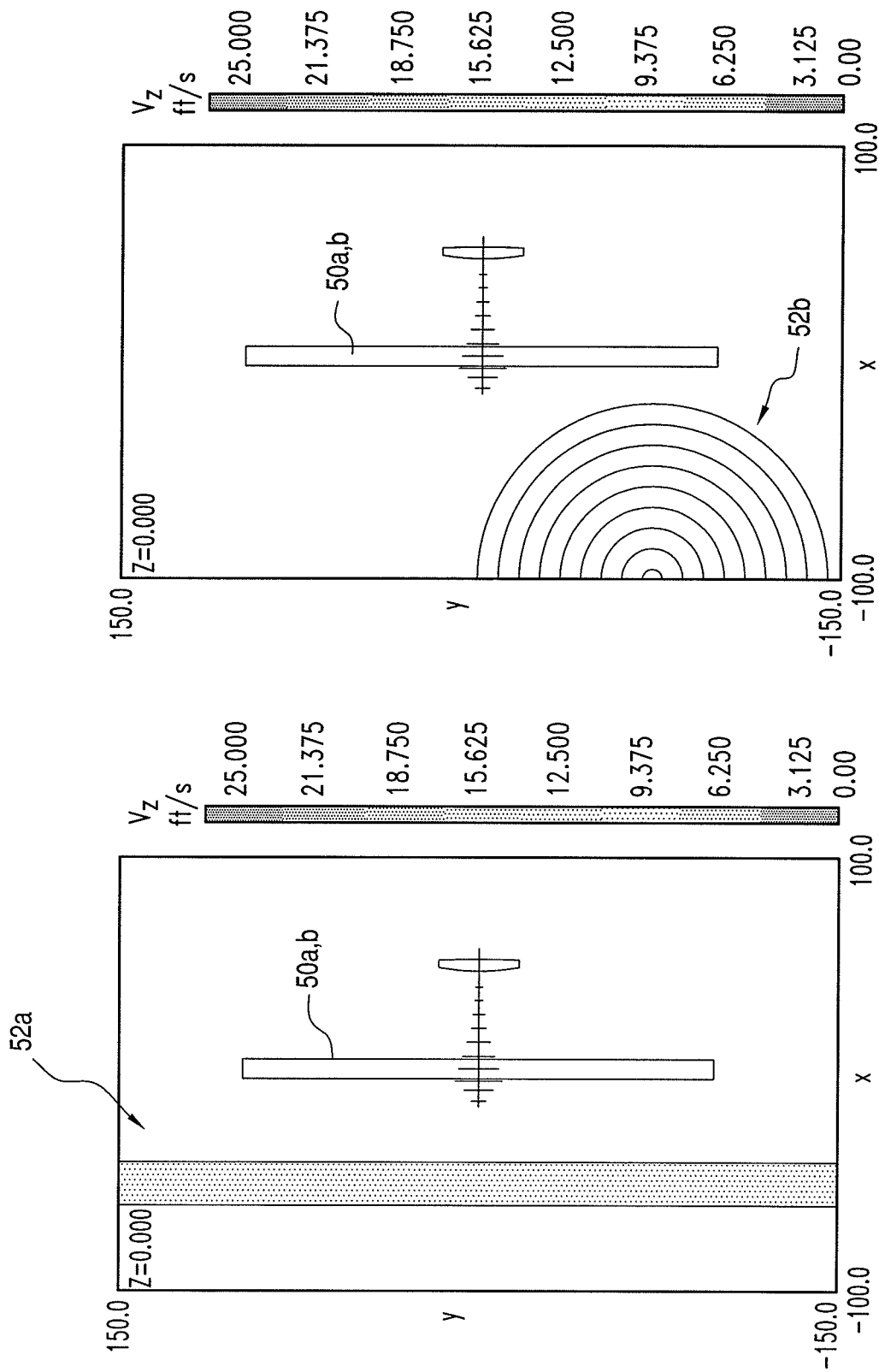
FIGS. 11A and 11B illustrate an aircraft with a wing-load alleviation structure according to an embodiment of the present invention encountering a substantially linear wind gust and a circular rising wind gust, respectfully.

To establish a performance baseline against which the load-limiting inflatable structures of interest can be measured, gust cases were identified that caused failure of the conventional rigid wing spar of the baseline aircraft 50a, 50b. The ASWing computer simulator has the capability to model a variety of gust scenarios, which consist of localized vertical velocity fields that the aircraft is "flown" through. These velocity fields can be either linear or radial in form and may be varied in size, location, amplitude, and direction. Two examples of gust velocity fields are shown in FIGS. 11A and 11B. Linear gusts 52a, and radial gust 52b are shown respectively in FIGS. 11A and 11B. Radial gust 52b illustrates the ability of aircraft 50a, b to withstand asymmetric load cases. Aircraft 50a, b can encounter radial (asymmetric) gust 52b loads (as shown in FIG. 11B) that can be smaller than the aircraft.

At the proposed cruising altitude of 80,000 feet, gust loads are relatively small. The potentially most dangerous portion of the mission profile occurs during ascent to, and decent from, cruising altitude, when aircraft 50a, b passes through more turbulent and denser layers of air. As such, all of the gust cases were evaluated at an altitude below 20,000 feet, where aircraft 50a, b is most likely to encounter a critical gust load.

As discussed above, according to an exemplary embodiment, hinge 10 can be an inflatable device, or spring, or other similar mechanism that allows omni-rotation. Hinge 10 allows a hinge vector (i.e., hinge effective line 12) to be specified, allowing the relative angles of attack between wing elements to change with joint deflection.

Figure 12:
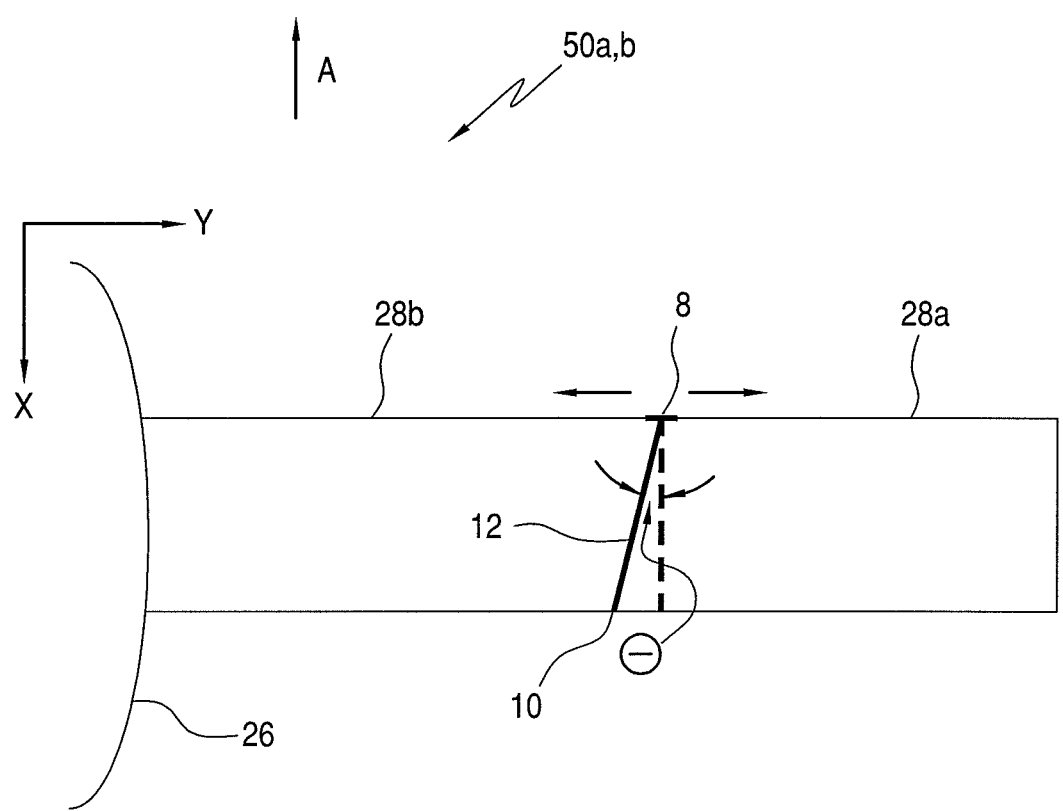
FIG. 12 illustrates a top view of a right wing span with a wing load alleviation structure according to an embodiment of the present invention and further showing an effective hinge line.
Figure 13:
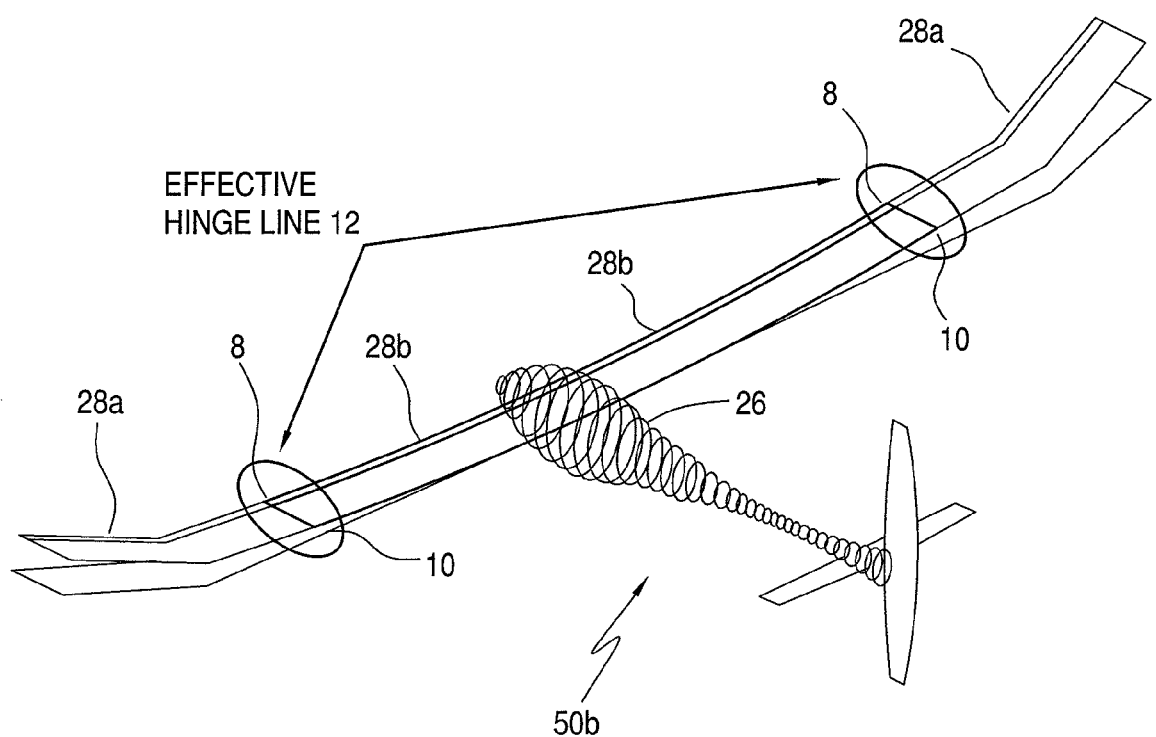
FIG. 13 is a rear perspective view of an aircraft with a wing load alleviation structure according to an embodiment of the present invention and further showing effective hinge lines on both the left and right wing spans.

In order to ascertain the effect of the location and relative angle of hinge effective line 12, its location was varied from 20% to 66% of the half span, (as measured with respect to inflatable spar segment 8) and the hinge vector was varied from 10 to 45 deg. FIG. 12 is a top view of aircraft 50a, b illustrating hinge 10, and further illustrates the definition of the hinge vector. FIG. 13 is a rear perspective view of aircraft 50b illustrating hinge inflatable spar segment 8, hinge 10, and effective hinge line 12. Tests were also conducted for spar deflection versus load moment for varying internal pressures of the inflatable spar section.

Figure 14:
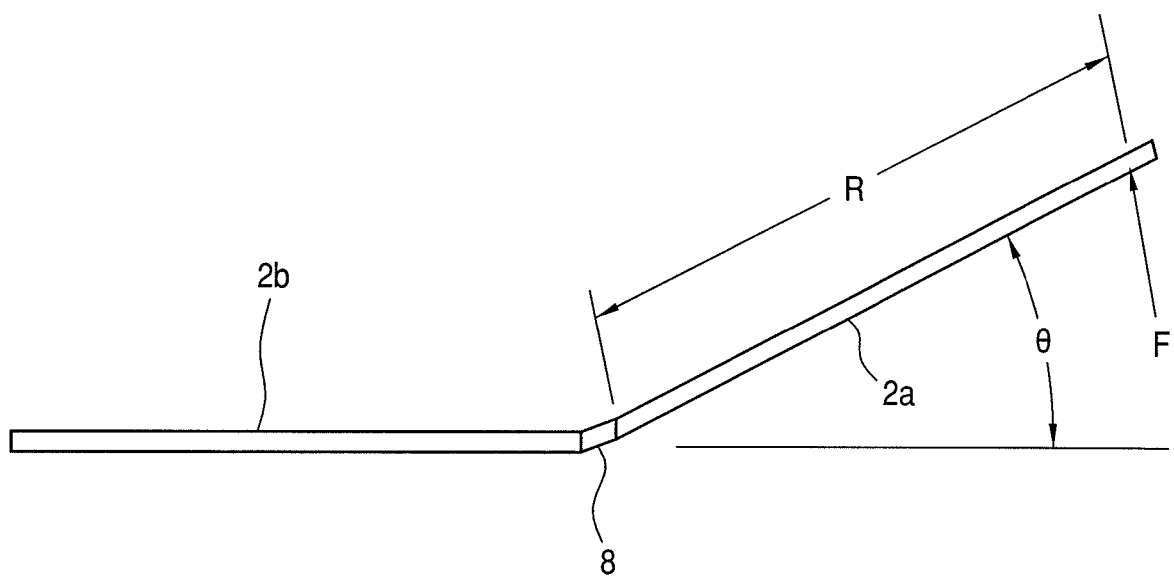
FIG. 14 illustrates a test set for measuring various properties of a wing load alleviation structure according to an embodiment of the present invention.

FIG. 14 illustrates a test set configuration for testing moment v. deflection response of inflatable spar segment 8 according to an exemplary embodiment. The test article comprises inflatable spar segment 8 forming a joint between spars 2, as shown in FIG. 3. Relevant variables include hinge gap length, insertion length, inflation pressure, section diameter, bias angle, strap strength and elongation at break. The inflatable spar segment 8 test article includes the following approximate dimensions as shown in Table II:

TABLE II

| Diameter | 2.5 inches |
|---|---|
| Insertion Length | >7.5 inches |
| Gap | test variable |
| Bias Angle | 75 degrees |
| Inflatable Length | 25 inches |
| Tube Length, Each | ~48 inches |

Figure 15:
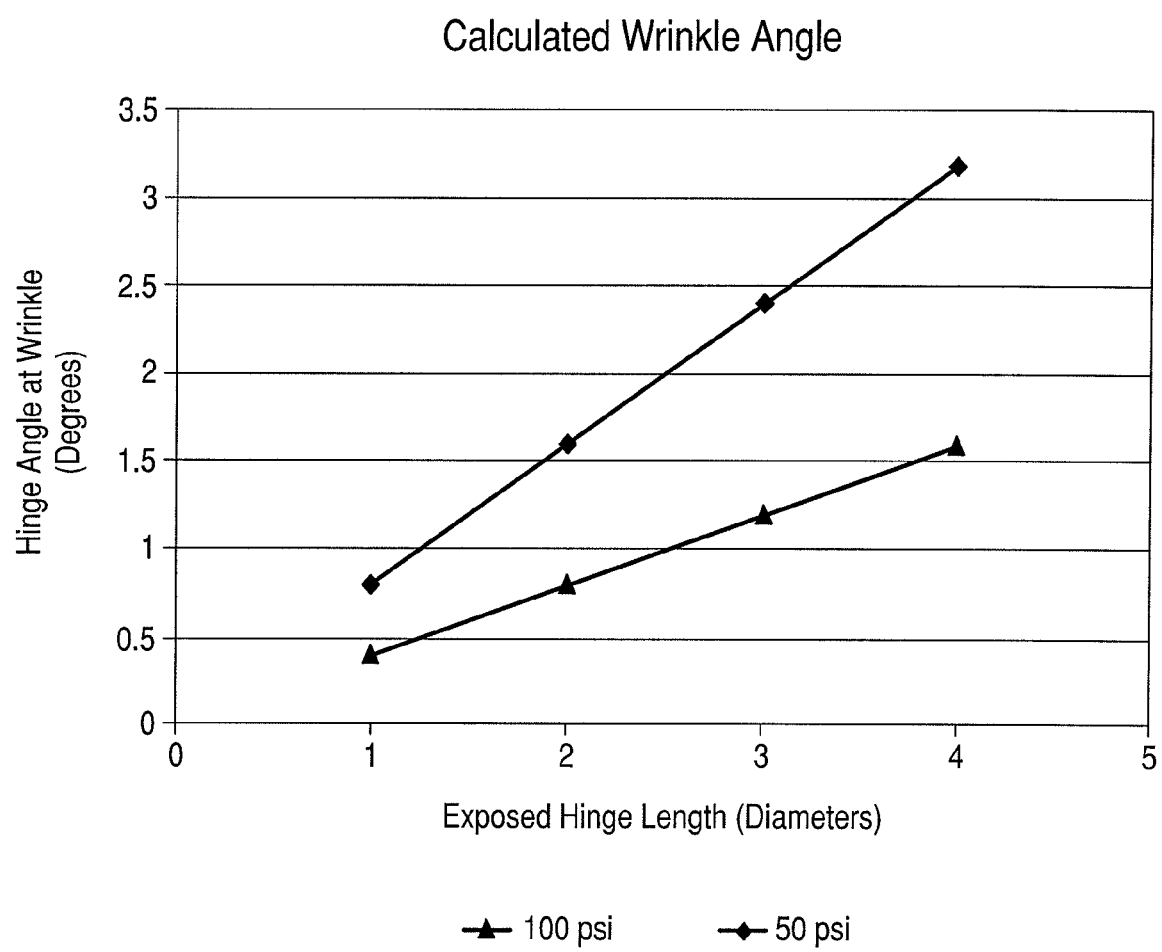
FIG. 15 illustrates a plot of hinge angle versus exposed hinge length as theoretically calculated for a wing load alleviation structure according to an embodiment of the present invention.
Figure 16:
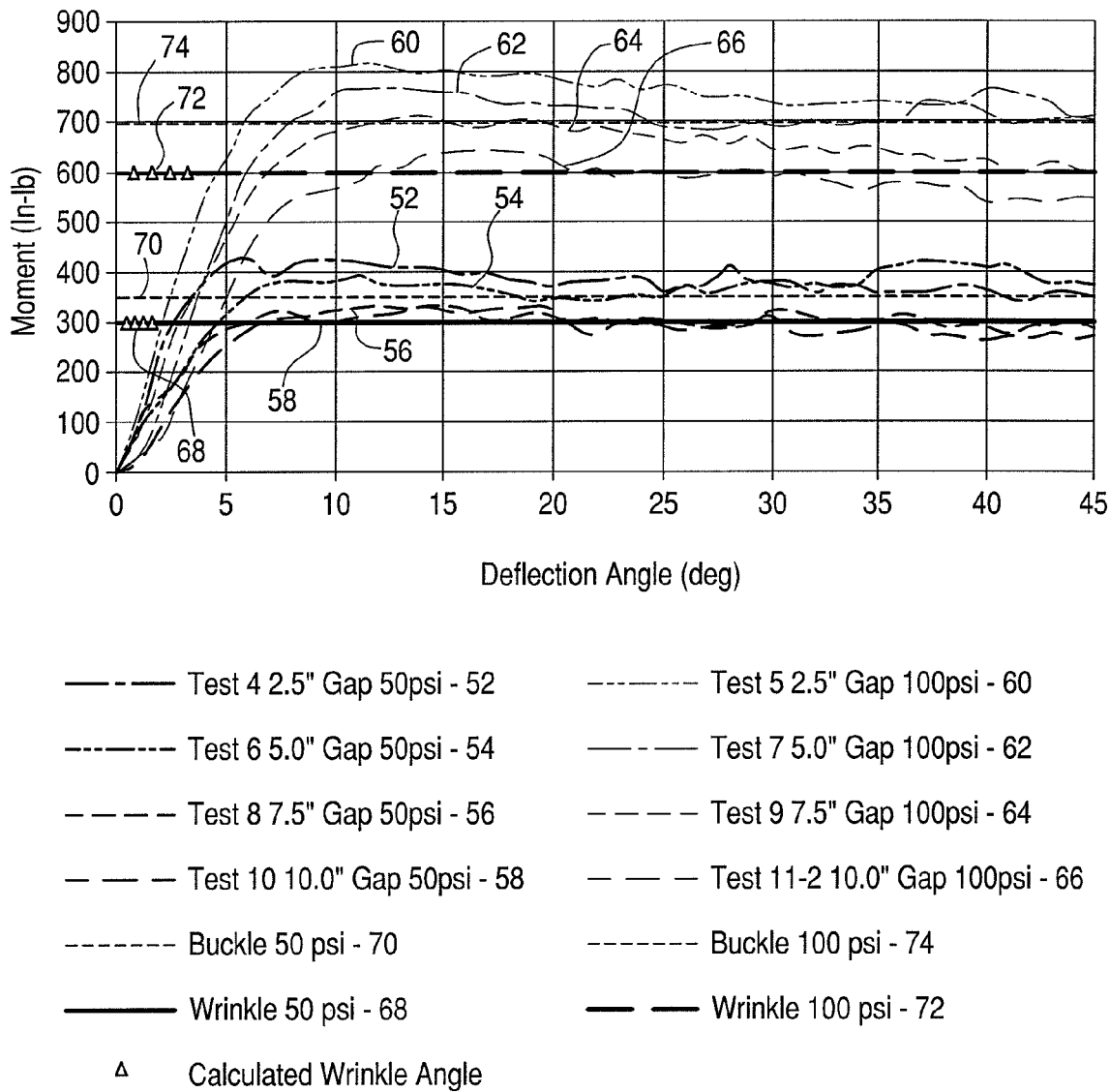
FIG. 16 illustrates results determined by testing performed on the configuration shown in FIG. 14 plotting moment values vs. deflection angles when the pressure and test gap length are varied according to an embodiment of the present invention.

The length of inflatable spar segment 8, according to an exemplary embodiment, measured as the length of the constant diameter section, is determined to allow a four diameter gap with a minimum three diameter insertion length. In the test setup inner spar 2b is fixed and outer spar 2a is movable by the application of a force. The force is applied at a fixed distance along outer spar 2a so that bending moment at the hinge is known. Force, deflection and inflation pressure are measured. Since wrinkle occurs at a small angle, data was obtained at small steps of deflection until past wrinkle. Although the qualitative results of the subscale inflatable hinge testing differ notably from inflatable structures theory (discussed below), the qualitative performance of the inflatable spar segment 8 test article is in keeping with expected behavior. FIG. 15 illustrates calculated wrinkle angles as a function of exposed hinge length for two test pressures according to an exemplary embodiment. FIG. 16 illustrates actual wrinkle angle onset as a function of several variables according to an exemplary embodiment. FIG. 16 differs from FIG. 6 for several reasons. FIG. 6 was developed from testing a long, fully inflatable spar 8, while FIG. 16 was a test of a short inflatable spar 8 segment between two rigid metal tubes. As can be seen, the loads in FIG. 16 show a buckling moment significantly above the prediction (the small triangles) based on the long inflatable spar tests (see FIG. 6). The resulting difference between the predicted and actual test values occurs because the metal tubes help to stabilize the shape of the inflatable spar, and thus delay the buckling. Once the buckling has begun, the bending loads stay very close to the predicted post-buckling value. As shown in FIG. 16, calculated 50 PSI wrinkle curve 68 should occur at about 0.5° to about 2.5° for the four different gaps, 2.5", 5.0", 7.5", and 10.0" respectively. As shown in FIG. 16, calculated 100 PSI wrinkle curve 72 should occur at about 1.0° to about 3.5° for the four different gaps, 2.5", 5.0", 7.5", and 10.0" respectively.

Data lines 60, 62, 64, and 66 represent bending moment vs. deflection angle measurements wherein inflatable spar 8 was inflated to 100 PSI, with a length of 2.5", 5.0", 7.5", and 10.0" respectively. The length of inflatable spar segment 8 at 2.5", 5.0", 7.5", and 10.0" indicates multiplies of inflatable spar segment diameters: 1, 2, 3, and 4 diameters, respectively. Data lines 52, 54, 56, and 58 represent bending moment vs. deflection angle measurements wherein inflatable spar 8 was inflated to 50 PSI, with a length of 2.5", 5.0", 7.5", and 10.0" respectively. The plot in FIG. 16 illustrates the bending moment vs. deflection angle, and, according to an exemplary embodiment, illustrates the two slope phenomena discussed in detail herein. The low slope near the origin is due to the bladder (inflatable spar segment 8) moving inside the metal tubes. In real use, it would be glued to the tubes, so that low slope would not happen, but in the test set-up, the bladder needed to be moved to expose different amounts of inflatable spar segments. According to an exemplary embodiment, the data supports the simplification of having an initial steep slope (stiff wing) followed by a long region of essentially constant moment, once inflatable spar segment 8 is past the wrinkle moment.

According to an exemplary embodiment of the present invention, one reason for the unexpected results in the actual wrinkle angles being larger than the predicted wrinkle angles is that there may have been non-bending deflections in the test setup. For example, the curves shown in FIG. 16, especially in regard to the cases with a 10-inch exposed hinge 10 length, show initial deflection near the origin. This could be due to slippage of inflatable spar segment 8 in the outer tube due to its relatively short insertion length. This could be easily eliminated if the hinge were bonded into the tube, but this was impractical for a test series in which hinge length was required to be variable. There is additional non-bending deflection due to the locally high bearing stress at the tube edges. Even a local small deflection of the surface of the inflatable translates into an angular deflection increase that is proportional to moment—an apparent decrease in stiffness. Bonding inflatable spar segment 8 into the tube would decrease this effect, as well.

As discussed above, FIG. 16 includes predicted values superimposed on the experimental results from the test series. Triangular markers 68, 72, indicate the predicted wrinkle angles, which are under-estimated as discussed above, and solid horizontal lines represent the predicted wrinkle moments for the two inflation pressures, 50 and 100 psi. The wrinkle moment can be seen in the results as the point at which deflection deviates from the initial linear behavior. While the wrinkle onset angle is consistently above the predicted value, the predicted wrinkle moments are in agreement with the results for exposed hinge lengths over 5 inches.

The dashed horizontal lines in FIG. 16 (70, 74) represent the predicted maximum moment after buckling. FIG. 16 illustrates that these predicted maximum moments are exceeded for the 2.5- and 5-inch hinge length cases at both 50 and 100 psi. This phenomenon may be due to additional resistance from the materials in compression, which is magnified by the shorter hinge lengths, and which is not accounted for in the theoretical values.

While the quantitative results differed from the theory of inflatable structures, the qualitative behavior is consistent with earlier observations and experiments. The inflatable segment shows characteristics useful for a gust-alleviating wing hinge, specifically high initial stiffness and consistent restoring moment over a large angular range. The results support a simplified mathematical model for hinges of this type, consisting of two linear segments corresponding to pre- and post-buckle. These characteristics are easily tailored for desired values of initial stiffness and final moment and are capable of repeated large deflections without damage. The advantages of a wing that can deflect and restore itself repeatedly, cannot be overstated. It provides aircraft designers with significant advantages over any known prior art design. According to an exemplary embodiment, deflection of a wing before buckling (i.e., on the steeper part of the applied moment vs. deflection angle curves (FIGS. 6, 16), is between about 1° and about 10°. According to a further exemplary embodiment, deflection of a wing following post buckling can be up to about 45°. As those of ordinary skill can appreciate, these are but exemplary values, and should be considered to be non-limiting in regard to the exemplary embodiments.

The ASWing® software program was also used to perform dynamic, coupled aero-structures simulations to assess the feasibility/performance of the experimental structure concept compared to a baseline conventional structure. The hinged configuration with inflatable spar segments experienced significantly reduced wing bending moments through a variety of gust scenarios, while remaining passively stable and automatically returning to the pre-buckle 1 G condition. Only the tailed configuration was examined during this phase of the project.

Figure 17C:
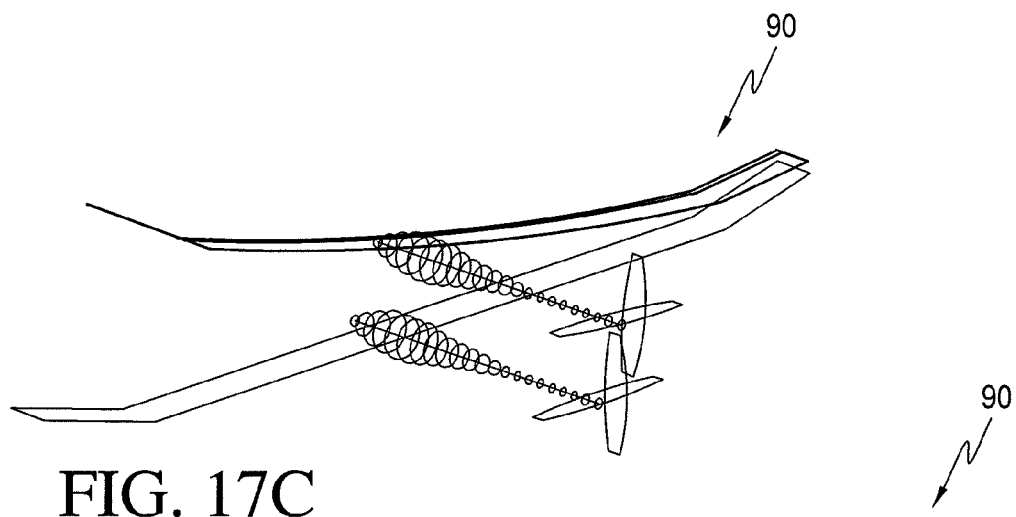
FIGS. 17A-17C illustrate several views of a conventional aircraft without the wing load alleviation structure shown in FIG. 1 as it encounters a radial gust and begins its recovery.
Figure 17B:
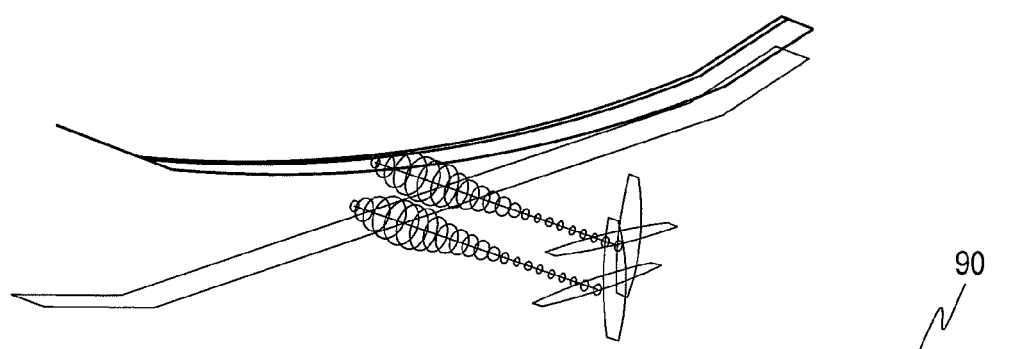
Figure 17A:
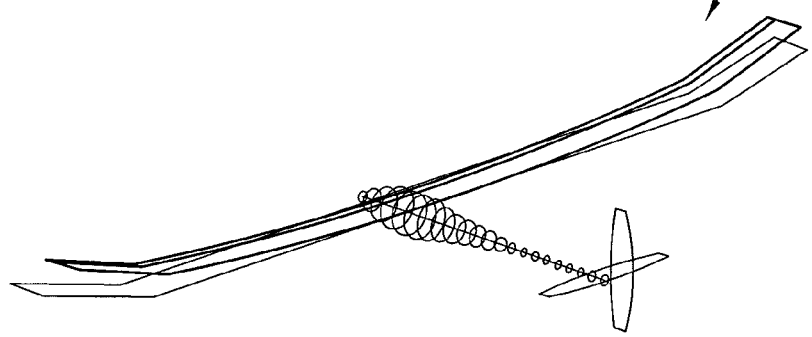
Figures 18A, 18B, 18C:
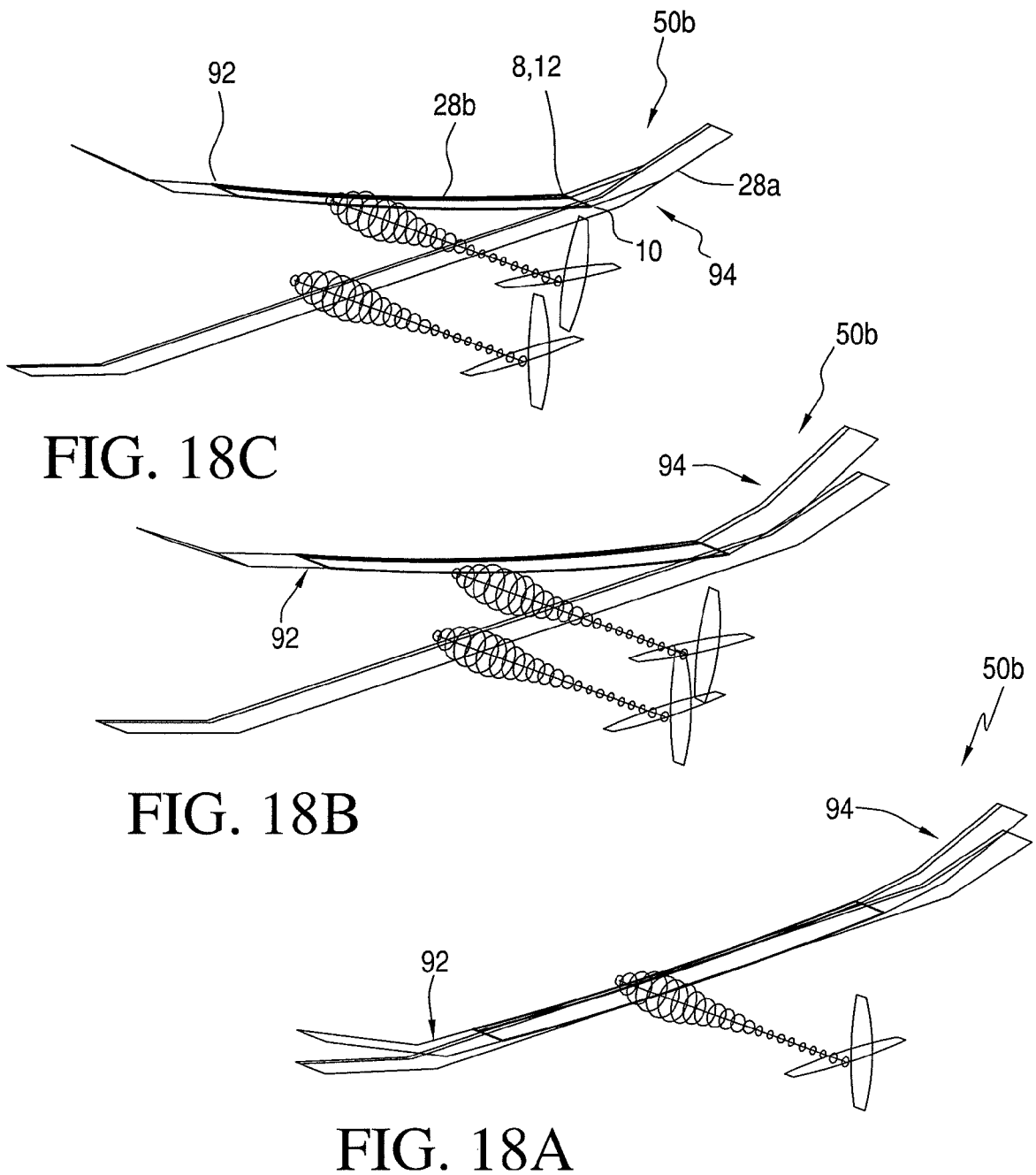
FIGS. 18A-18C illustrate several views of an aircraft with a wing load alleviation structure according to an embodiment of the present invention as it encounters a radial gust and begins its recovery.

FIGS. 17A-17C illustrate a simulated gust encounter for a rigid wing aircraft 90 at several time steps, and FIGS. 18A-C illustrate a simulated gust encounter for hinged wing aircraft 50b at several time steps according to an exemplary embodiment. Hinged aircraft 50b has simulated inflatable spar segment 8 and hinge 10 located at about 50% of the half span, pressurized to 50 psi, and angled at 35 degrees (effective hinge line 12). The gust is the same for both cases, a 35 foot-per-second (fps) radial updraft at 20,000 ft centered on the left wing tip.

Conventionally winged aircraft 90 enter the gust in wings-level 1 g flight (FIG. 17A). As aircraft 90 passes through the gust, it is shoved upwards by its left wing 28 causing an increasing load on right wing 28; this causes both the left and right wings to rise (FIG. 17B). Once the gust has passed, the wings begin to return to their 1 g position (FIG. 17C). While the aircraft wing has returned to its nominal shape, the gust response has resulted in a roll motion, which would then have to be corrected by the aircraft autopilot.

Hinged aircraft 50b enters the gust in wings-level 1 g flight (FIG. 18A). As aircraft 50b passes through the gust, it is shoved upwards by its left wing 92 causing an increasing load on the right wing 94 that then causes the inflatable joint to "buckle" and the right wingtip (outer panel 28a) to deflect (FIG. 18B). Interestingly, the tip panel outside of the gust (right wing outer portion wing panel 28a) experiences the largest deflections due to a whip-like elastic response of the wing. Due to the 35 degree hinge angle (hinge line 12), this deflection results in a reduction in angle of attack (see FIGS. 5 and 8), unloading the tip panel and limiting the bending moment seen at the root. The "roll rate" of the deflecting wing 94 also causes a reduction in the tip angle of attack and thus tip lift and bending moment. This effect is in addition to the geometric effect of the canted hinge line 12. As wing 94 continues to bend, the aero load becomes lower until the net load on wing 94 is small enough to cease bending (FIG. 18B). Once the gust has passed, the tip returns to its 1 g position (FIG. 18C). The residual roll angle is approximately equal for both cases (i.e., hinged aircraft 50 and rigid wing aircraft 90; ailerons were held at 0 deg throughout the gust encounter), indicating no appreciable destabilizing effects of hinge line 12 configuration.

Figure 19A:
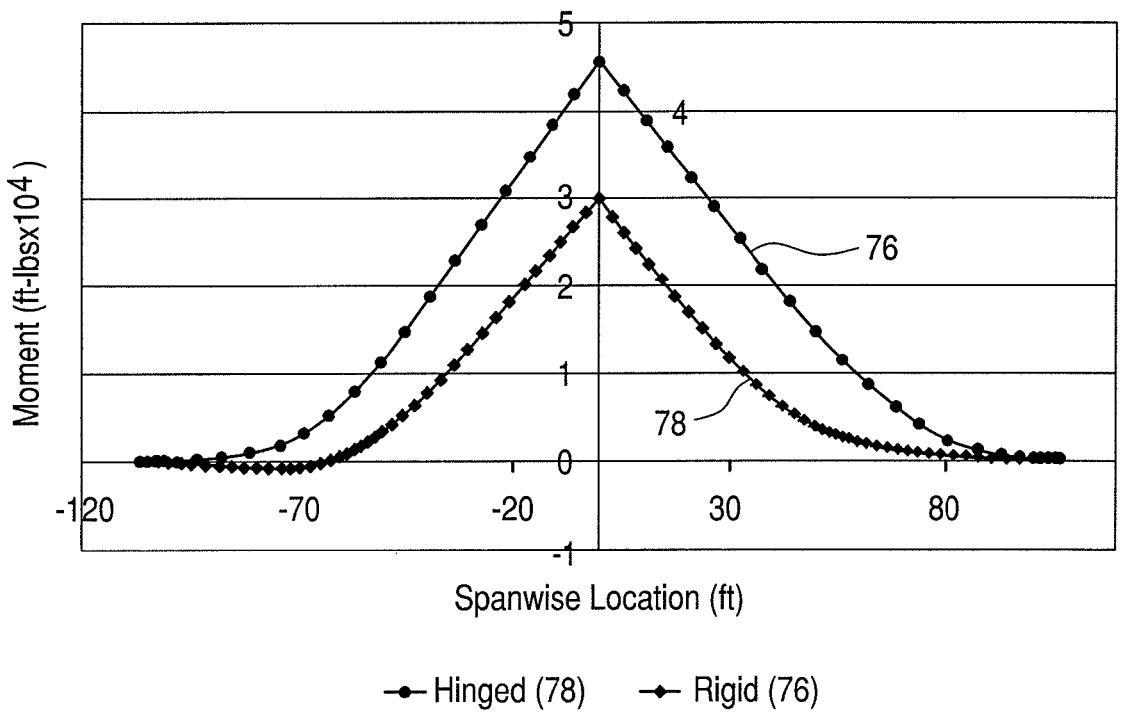
FIG. 19A illustrates a plot of bending distributions for about a 35 foot per second (ft/s) vertical gust for both an aircraft with a conventional wing, and an aircraft with a wing that employs a wing load alleviation structure according to an embodiment of the present invention.
Figure 19B:
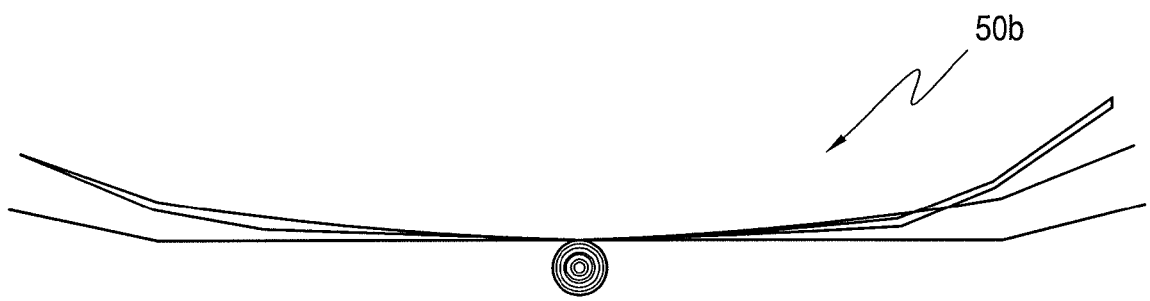
FIG. 19B illustrates a front view of the wing with the wing load alleviation structure according to an embodiment of the present invention.

FIGS. 19A and 19B illustrate a span-wise bending moment distribution for both rigid wing aircraft 90 and hinged wing aircraft 50 with hinged wing 28 at a moment time in which the wing encounters maximum bending loads according to an exemplary embodiment. According to an exemplary embodiment, FIG. 19A clearly illustrates that the reduction in load is evident; aircraft 50b with inflatable spar segment 8 and hinge 10 experiences a maximum root bending moment (line 78)

about 36% lower than that of rigid wing aircraft 90 with a conventional spar (line 76). This corresponds to a 1.4 g load on rigid wing aircraft 90, indicating that, according to an exemplary embodiment, aircraft 50a, b can be built to a seemingly fragile 1.5 g limit load and there is significant confidence that it will survive most low altitude gust encounters. This significant reduction in the limit load should translate directly to marked wing structure weight savings.

Additionally, FIGS. 19A and 19B illustrate that, according to an exemplary embodiment, the reduction in bending moment for hinged aircraft 50b, is uniform throughout the span. There are substantially no local increases in bending moment around hinge 10 elements, indicating that the need for local reinforcements around hinge 10 would be minimal. Therefore, any weight penalty associated with adding inflatable spar segment 8 and hinge 10 would be small and well outweighed by the overall reduction in necessary spar material.

Figure 20:
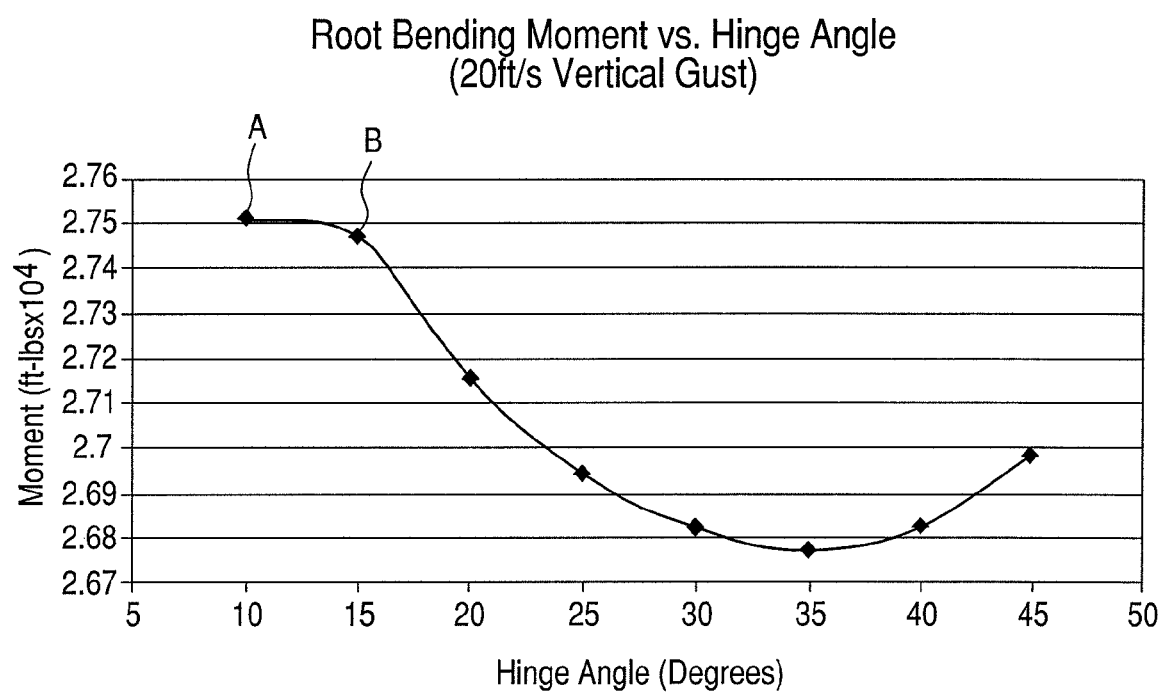
FIG. 20 illustrates a plot of root bending moment versus an angle of an effective hinge line according to an embodiment of the present invention.
Figure 21:
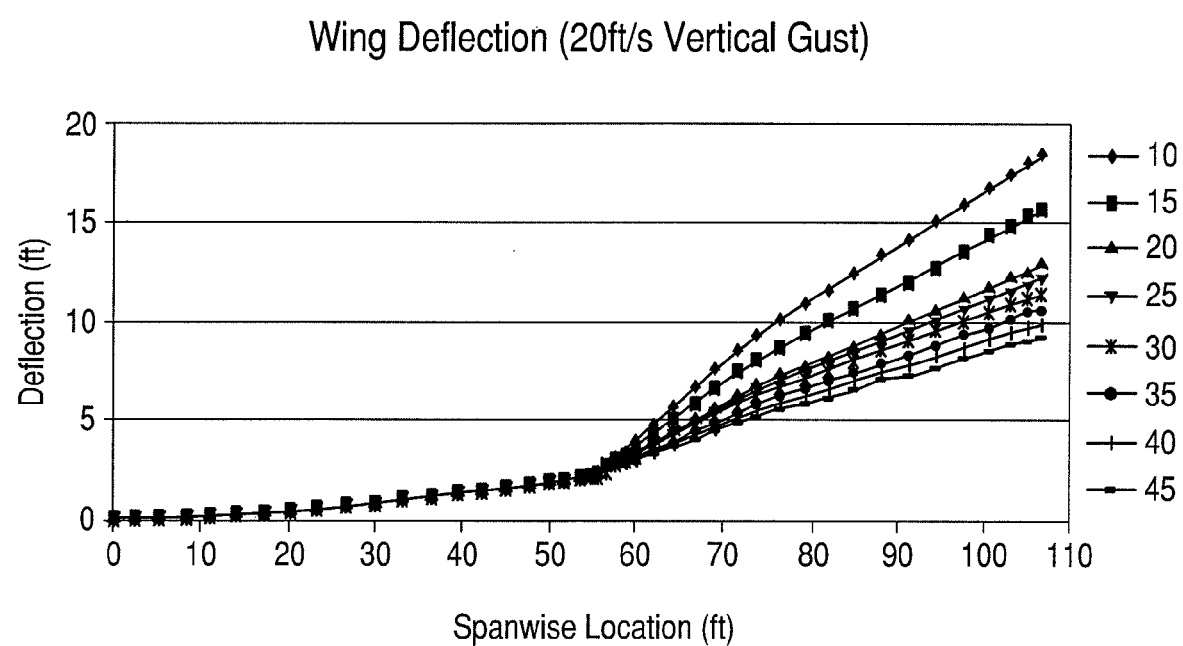
FIG. 21 illustrates a plot of wing deflection at about a 20 ft/s vertical gust showing values of deflection versus span wise location for different angles of an effective hinge line according to an embodiment of the present invention.

As briefly discussed above, according to an exemplary embodiment, the placement of effective hinge line 12, and the angle it forms on wing 28, affects the recovery of outer panel 28a following deformation. Therefore, experiments were conducted to optimize the hinge configuration, as illustrated in FIGS. 20 and 21. Hinged aircraft 50b described above was flown through a radial gust of about 35 fps while effective hinge line 12 was varied from 10 to 45 degrees. The maximum root bending moments vs. hinge angle experienced during these cases are plotted in FIG. 20. While a minimum does exist at a hinge angle of about 35°, according to an exemplary embodiment, the total difference in maximum root bending moment observed varies by only about 3% over the range of effective hinge line 12 angles. The optimum effective hinge line 12 angle becomes more obvious given the maximum wing deflections plotted in FIG. 21. Smaller hinge angles (e.g. 10°, 15°) correspond to increasingly larger tip deflections (15 feet plus), and these tip deflections can be related directly to the duration of the buckling recovery (i.e., the larger the deflection, the longer it takes to recover). Thus while the lower hinge angle cases see similar root bending moments (FIG. 20, points A and B, about 2.75 ft-lbs$\times 10^4$), the time to return to the 1 g flight configuration is substantially lengthened, which could lead to stability and control issues. According to an exemplary embodiment, the angle of effective hinge line 12 that lowered deflections to a minimum is about 45°. As FIG. 712 illustrate, effective hinge line 12 is canted inwards or towards fuselage 26 of aircraft 50.

Figure 22:
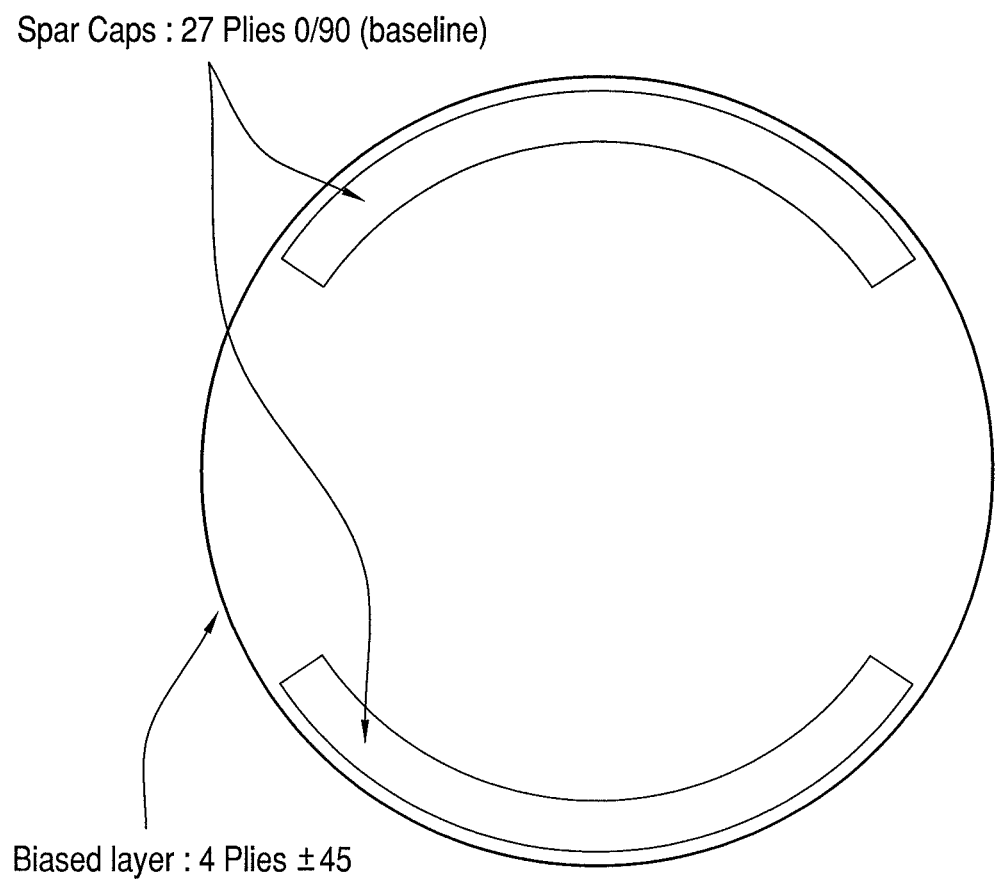
FIG. 22 illustrates a cross sectional view of a spar segment at a wing root built to withstand about at least a 3.5 g pull-up according to an embodiment of the present invention.

FIG. 22 illustrates a cross sectional view of a spar segment at a wing root built to withstand at least about a 3.5 g pull-up according to an exemplary embodiment. To estimate the structural mass savings potential of the hybrid spar with inflatable joints concept, the rigid spar from aircraft 90 was scaled to reflect the reduction in gust-induced bending moment discussed above. The baseline spar was sized to withstand at least about a 3.5 g pull-up, and consists of a 4 ply biased outer wrap, to resist twisting, with variable ply 0/90 spar caps. The spar cap ply count varies linearly (in a stepped manner) from 27 plies at the root to 7 plies at the half span and then remains constant to the tip (See FIGS. 22, 23).

Figure 23:
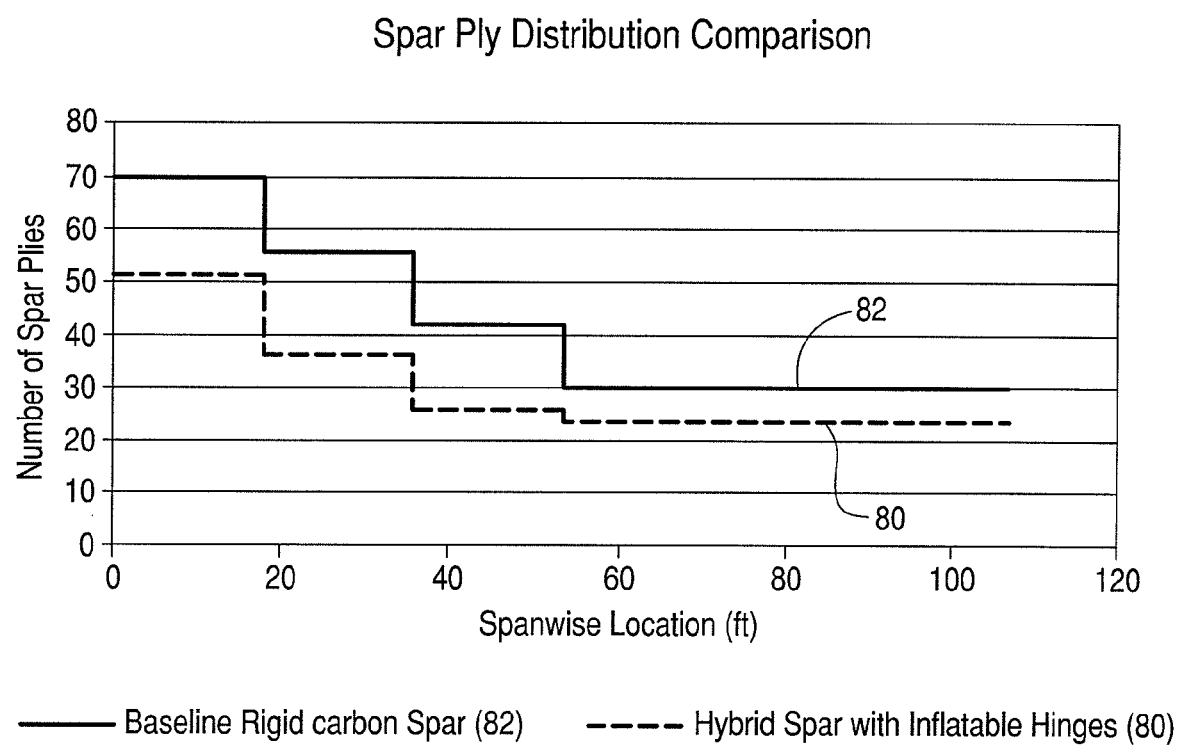
FIG. 23 illustrates a comparison of a spar ply distribution for a conventional wing and a wing with the wing load alleviation structure according to an embodiment of the present invention.

To estimate the ply distribution for the hybrid spar, local spar cap ply counts were scaled from the baseline using the ratio of bending moments depicted in FIG. 19A (towards the tip, scaling was limited to assure an adequate number of plies in the lay-up). The results of this scaling are depicted in FIG. 23. Spar mass could then be estimated based on the total number of plies in the spar.

According to a preferred embodiment, the hybrid spar embodiment (line 80) was shown to reduce the required structural mass by nearly 28% compared to the baseline rigid carbon spar embodiment (line 82). This figure includes an approximation of the additional mass required for the hybrid spar elements including, inflatable spar segment 8, hinge 10, inflatable spar segment bladder, bladder feed line, and air compressor, which amounts to about 9 lbs. For aircraft 50 considered in this study, this 28% savings in spar mass amounts to an approximately 4.5% reduction in total aircraft mass. For an aircraft with about a 10% payload fraction, utilizing this hybrid spar concept can increase payload capacity by approximately 50%, or with a fixed payload, there could be a significant reduction in vehicle size and gross weight.

The analysis and test results discussed above in detail show that the hybrid spar concept (i.e., use of inflatable spar segment 8 in an otherwise rigid main spar 2) provides for a reduction in wing structural mass fraction. Spar mass savings are realizable, according to an exemplary embodiment, without incurring significant mass penalties for the technology itself, due to the simplicity of the system, requiring only short inflatable spar segments 8 themselves. The graceful handling of buckling means the aircraft designer is freed from having to design spar structures to meet peak gust loads.

The inflatable hybrid spar concept also has the significant benefit that it is self-recovering, without requiring any external action or "intelligence." While the analysis case chosen showed the hybrid spar reduced loads by about ⅓ compared to the baseline, it is interesting to note that while more severe gusts would increase the loading on the baseline rigid aircraft, the moment limiting nature of the hybrid spar would likely subject that aircraft to little or no additional increase in root bending moment. Furthermore, as those of ordinary skill in the art can appreciate, inflatable spar structure 8 can be further described as a pneumatic device, and therein inflatable spar structure 8 can be inflated with more than one type of gas, air included, and can also be inflated with different types of fluid, for example, a viscous oil.

Figure 24:
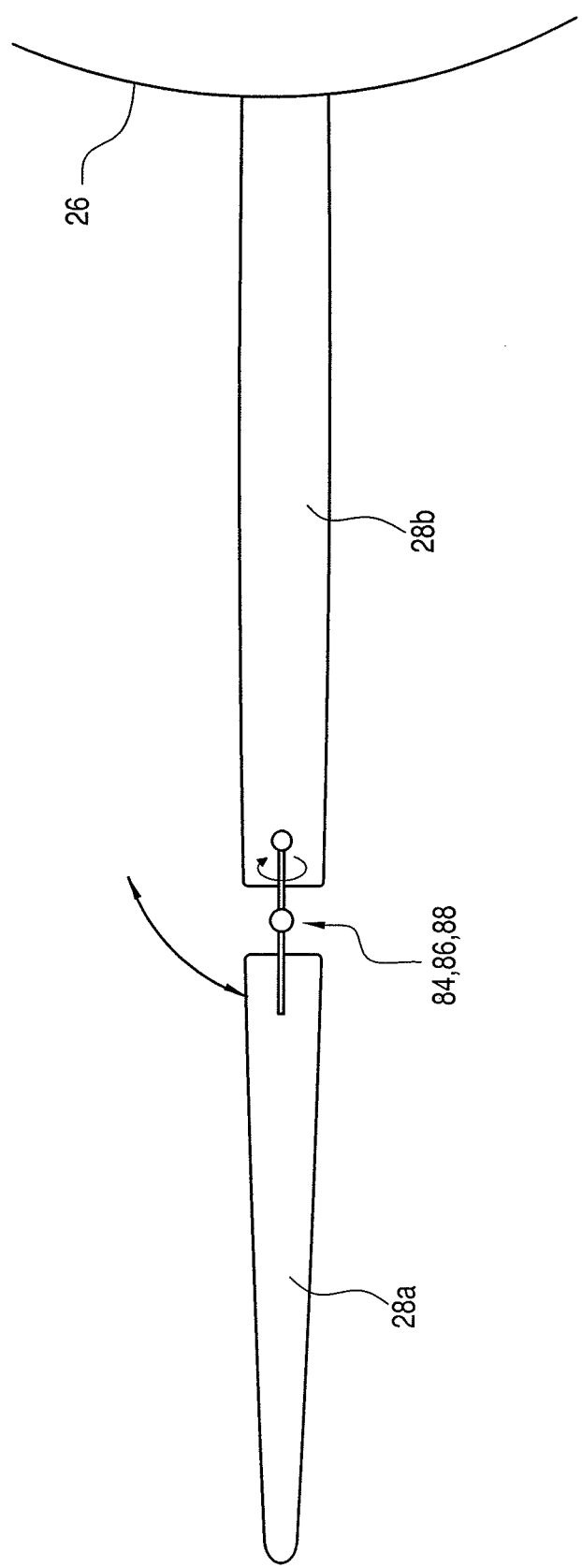
FIG. 24 illustrates a wing segment showing front and rear spars, with an omni-rotational mechanical spar segment in the front spar according to an embodiment of the present invention.

As those of ordinary skill in the art can appreciate, there are alternate methods for providing flexibility between rigid spar structures so that deformation of wing panels can occur. Referring to FIG. 24, for example, according to an alternate embodiment, inflatable spar segment 8 can be replaced with omni-directional hinge 84 and overload clutch 86. As those of ordinary skill in the art can appreciate, overload clutch 86 limits the peak bending moment while being essentially rigid at lower loads. In this case a motor (not shown) drives outer wing panel 28a back to its nominal shape after the gust encounter. While this system is more complicated than the pneumatic spar segment described above, it can have advantages in certain situations.

Hinge 10 can be replaced with a similar structure, or, as discussed above, any mechanical device that allows multi or omni-directional bending and restoration. If wing panel 28 employs omni-directional hinge 84, overload clutch 86 prevents its restoration without the application of an additional outside force. Therefore, according to an alternate embodiment, a mechanical winch or lever arm 88, or similar device, provides the force necessary to restore the wing panel portion that has deformed. Of course, effective hinge line 12 can still be employed to reduce the angle of attack on the deformed section of the wing, thereby decreasing the load that that lever arm 88 has to overcome to restore the deformed section of the wing to its normal configuration.

Figure 25:
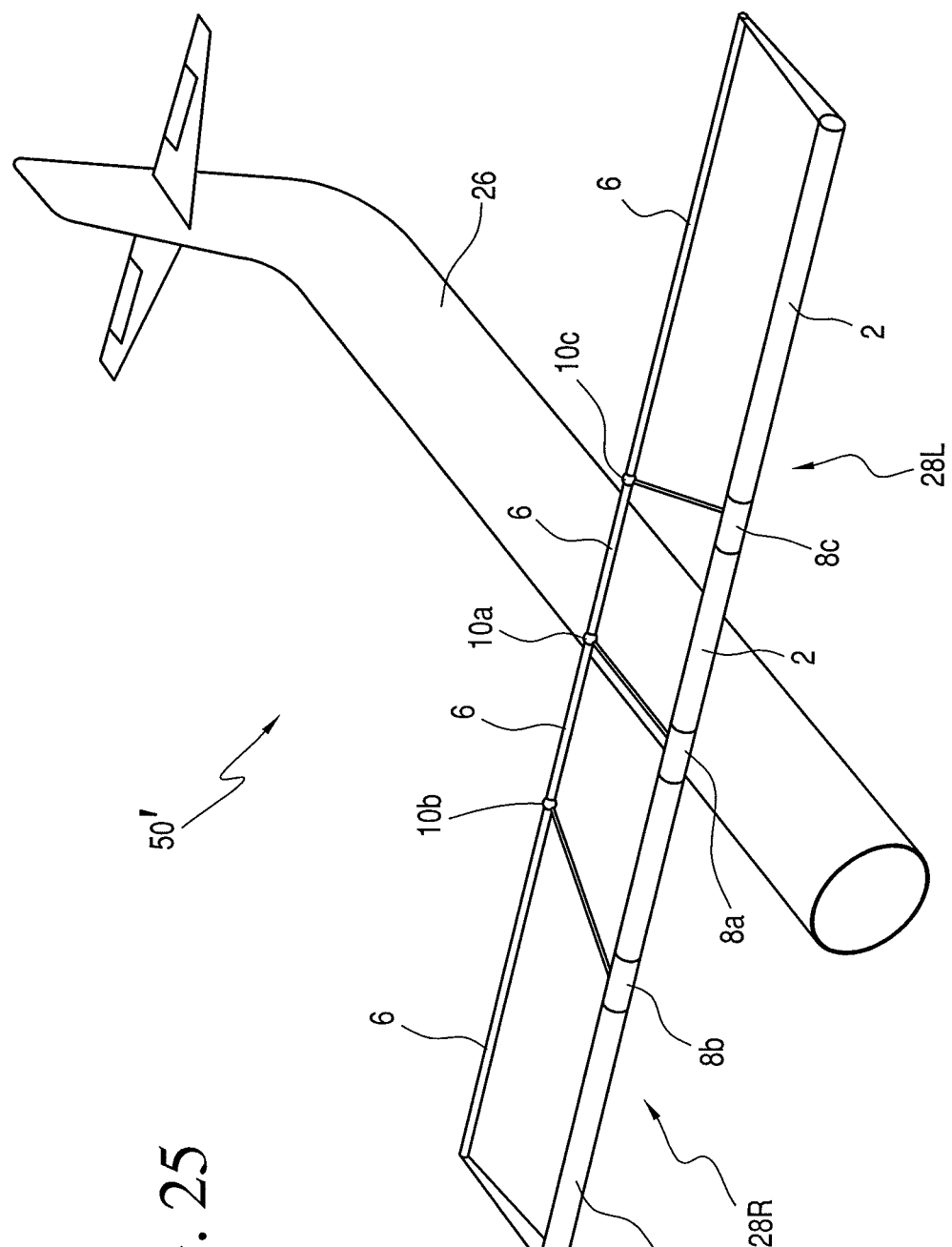
FIG. 25 illustrates an aircraft using an inflatable spar segment of the present invention according to an exemplary embodiment.

FIG. 25 illustrates an exemplary embodiment of aircraft 50' utilizing a wing load alleviation structure according to a particular exemplary embodiment. In aircraft 50', inflatable spar segment 8a has been placed along a centerline of aircraft 50', and its respective hinge 10a is also located along the centerline, but aft of inflatable spar segment 8, along rear spar 6. Each of left wing 28L and right wing 28R can include at least one additional inflatable spar segment 8, and its respective hinge 10 (but not necessarily). The outer portions of each of left and right wings 28L, 28R as shown in FIG. 25 operate substantially similarly to the exemplary embodiment discussed above in regard to FIG. 1, and thus, a detailed discussion thereof need not be made for the dual purpose of brevity and clarity. However, since inflatable spar segment 8a and its respective hinge 10a are located along the centerline of fuselage 26, then each of wings 28L and 28R can deflect in a manner as has already been described, but instead of a deflection occurring only at some distance from the fuselage along the wing 28 (with instable spar segment 8b and hinge 10b; or along inflatable spar segment 8c and its respective hinge 10c), deflection can occur at the center of aircraft 50 of either or both of wings 28L, 28R. If centerline deflection occurs, then it is also possible that deflection of either or both of inflatable spar segment 8a and its respective hinge 10a, and inflatable spar segment 8b and its respective hinge 10b, can occur. As those of ordinary skill in the art can appreciate, other configurations of wing(s) 28 are possible, including adding 2, 3 or 4 (or more) pairs of inflatable spar segments 8 and hinges 10, putting wing(s) 28 under the aircraft, among other types of configurations.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A wing structure for use on an aircraft, comprising:
   a front spar, wherein the front spar includes
      at least one rigid front spar structure and at least one inflatable spar structure positioned inboard of the at least one rigid front spar structure; and
   a rear spar, wherein the rear spar includes
      at least one rigid rear spar structure and a pivot joint positioned inboard of the at least one rigid spar structure.

2. The wing structure for use on an aircraft according to claim 1, wherein,
   when a load is applied to the wing structure, for a first range of load values, deflection occurs for each of the at least one rigid front spar and each of the at least one rigid rear spar within a first range of deflection values, and
   for a second range of load values, deflection occurs for each of the at least one rigid front spar and the at least one rigid rear spar within a second range of deflection values, such that
   a minimum ratio of load values to deflection values within the first range of deflection values is greater than a maximum ratio of load values to deflection values within the second range of deflection values.

3. The wing structure according to claim 2 wherein
within the first range of load values, a first ratio of load values to deflection values is substantially constant, within the second range of load values, a second ratio of load values to deflection values is substantially constant.

4. The wing structure according to claim 2, wherein
the second range of deflection values corresponds to a range of load values within which a metal spar would bend.

5. The wing structure according to claim 2, wherein
the second range of deflection values corresponds to a range of load values within which a spar built from composite materials would break.

6. The wing structure according to claim 1, wherein
the at least one inflatable spar structure is positioned at between about 25% and 75% of a distance from a fuselage of the aircraft to a wing tip of the wing structure.

7. The wing structure according to claim 1, wherein
the at least one inflatable spar structure is positioned at about 50% of a distance from a fuselage of the aircraft to a wing tip of the wing structure.

8. The wing structure according to claim 1, wherein
a number of inflatable spar structures of the front spar and a number of rear pivot joints of the rear spar are equal, such that for each of the front inflatable spar structures there is a corresponding one of the rear pivot joints, and further wherein,
each rear pivot joint of the rear spar is located at a first position that is substantially perpendicular from its corresponding inflatable spar structure of the front spar.

9. The wing structure according to claim 8, wherein
an effective hinge line is formed by each inflatable spar structure and corresponding pivot joint, such that
   when deflection occurs, each of an outermost front rigid spar and an outermost rigid rear spar bends about the effective hinge line.

10. The wing structure according to claim 9, wherein
the effective hinge line is formed at an angle of between about 0° and 45° with respect to the effective hinge line when the pivot joint is positioned at the first position.

11. The wing structure according to claim 9, wherein
the effective hinge line is formed at an angle of about 30° with respect to the effective hinge line when the pivot joint is positioned at the first position.

12. The wing structure according to claim 1, wherein
when an applied load on the wing structure exceeds a predetermined minimum threshold,
   the at least one inflatable spar structure and the at least one pivot joint are configured to bend substantially similarly, and thus to twist an outermost rigid front spar and an outermost rigid rear spar,
      such that the outermost front rigid spar of the wing structure has a lower elevation than the outermost rigid rear spar of the wing structure.

13. The wing structure according to claim 2, wherein
when the load is reduced from a first value within the second range of load values to a second value within the first range of load values, the wing structure recovers to an original form.

14. An aircraft, comprising:
a fuselage;
at least one vertical control surface appended to the fuselage;
at least one horizontal control surface appended to the fuselage; and
a wing structure having (i) a first portion and (ii) a second portion which is closer to the fuselage that the first portion,
a hinge coupled to the wing structure and configured such that the first portion of the wing structure elastically deforms upward under a sufficient airflow bending load to a first deformation point, such that the first portion of the wing structure generates reduced lift while deformed, and wherein when the sufficient airflow bending load is removed, the wing structure is configured to restore itself to its original shape, and wherein the hinge is also configured such that, when the first portion is elastically deformed under the sufficient airflow bending load, an angle of attack of the first portion with respect to the airflow is reduced by moving a leading edge of the first portion lower with respect to a trailing edge of the first portion, subsequently reducing lift.

15. The aircraft according to claim 14, wherein
the wing structure can deform and restore itself multiple times without breaking or failing permanently.

16. The aircraft according to claim 14, wherein the first portion of the wing structure comprises:
a substantially flexible component joined to the fuselage; and
a substantially stiff component joined to the substantially flexible component.

17. The aircraft according to claim 16, wherein the substantially flexible component comprises:
a pneumatic structure, filled with a gas.

18. The aircraft according to claim 17, wherein the pneumatic structure comprises:
an inflatable spar structure.

19. The aircraft according to claim 16, wherein the substantially flexible component structure comprises:
a flexible apparatus, configured to flex in at least two directions.

20. The aircraft according to claim 14 further comprising:
a motor driven apparatus configured to restore the first portion of the wing structure to its original shape in the absence of the sufficient bending moment.

21. An aircraft, comprising:
a fuselage;
at least one vertical control surface appended to the fuselage;
at least one horizontal control surface appended to the fuselage;
a right wing structure for use on the aircraft, wherein the right wing structures includes
a front spar, wherein the front spar includes
at least two front right rigid spar structures and an inflatable right spar structure positioned between the at least two front right rigid front spar structures, and
a rear spar, wherein the rear spar includes
at least two rear right rigid spar structures and a pivot joint positioned between the at least two rear right rigid rear spar structures;
a centerline inflatable spar structure, positioned over a centerline of the aircraft, wherein
a right side of the centerline inflatable spar structure is attached to a most inboard front right rigid spar structure; and
a left wing structure for use on the aircraft, wherein the left wing structures includes
a front spar, wherein the front spar includes
at least two front left rigid spar structures and an inflatable left spar structure positioned between the at least two front left rigid front spar structures, and
a rear spar, wherein the rear spar includes
at least two rear left rigid spar structures and a pivot joint positioned between the at least two rear left rigid rear spar structures, and wherein
a left side of the centerline inflatable spar structure is attached to a most inboard front left rigid spar structure.

22. The wing structure for use on an aircraft according to claim 21, wherein,
when a load is applied to the wing structure, for a first range of load values, deflection occurs for each of the at least one rigid front spar and each of the at least one rigid rear spar within a first range of deflection values, and
for a second range of load values, deflection occurs for each of the at least one rigid front spar and the at least one rigid rear spar within a second range of deflection values, such that
a minimum ratio of load values to deflection values within the first range of deflection values is greater than a maximum ratio of load values to deflection values within the second range of deflection values.

23. The wing structure according to claim 22 wherein
within the first range of load values, a first ratio of load values to deflection values is substantially constant, and
within the second range of load values, a second ratio of load values to deflection values is substantially constant.

24. The wing structure according to claim 22, wherein
the second range of deflection values corresponds to a range of load values within which a metal spar would bend.

25. The wing structure according to claim 22, wherein
the second range of deflection values corresponds to a range of load values within which a spar built from composite materials would break.

26. The wing structure according to claim 21, wherein
the at least one inflatable spar structure is positioned at between about 25% and 75% of a distance from a fuselage of the aircraft to a wing tip of the wing structure.

27. The wing structure according to claim 21, wherein
the at least one inflatable spar structure is positioned at about 50% of a distance from a fuselage of the aircraft to a wing tip of the wing structure.

* * * * *